United States Patent [19]
Heitman et al.

[11] Patent Number: 5,810,245
[45] Date of Patent: Sep. 22, 1998

[54] METHOD AND APPARATUS FOR CONTROLLING AIR FLOW IN A STRUCTURE

[76] Inventors: Lynn Byron Heitman, 4711 Sycamore La., Parker, Tex. 75002; George D. Ezell, 1519 Comanche Ct., Grandbury, Tex. 76048

[21] Appl. No.: 893,850

[22] Filed: Jul. 11, 1997

[51] Int. Cl.$^6$ .............................. F24F 7/00; G05D 15/00
[52] U.S. Cl. ......................... 236/49.3; 165/208; 236/51; 236/78 C; 251/129.11
[58] Field of Search .................... 236/49.3, 51, 78 C; 165/217, 208; 251/129.11

[56] References Cited

U.S. PATENT DOCUMENTS

| | | | |
|---|---|---|---|
| 4,824,012 | 4/1989 | Tate | 236/51 X |
| 4,838,483 | 6/1989 | Nurczyk et al. | 236/49.3 |
| 4,931,948 | 6/1990 | Parker et al. | 165/208 X |

*Primary Examiner*—William E. Wayner

[57] ABSTRACT

Flow control valves (19) are provided and interfaced with the HVAC ducts (14) at the efferent ends (16) in adjoining rooms of a structure. A flow control command device (29), mounted on the wall of the structure (25), is provided to control the flow of air through the HVAC ducts (14) in response to flow control commands. Flow control commands are transmitted by wireless means to the command decoder (22) and converted to flow control signals. A flow control signal bus (21) is provided to connect the flow control signals to the flow control valves (19). A master thermostat (32) is connected directly to the HVAC system (10) and in series with a slave thermostat (30). This series thermostat connection causes control of the HVAC system (10) to be determined by the thermostat located in the room that receives the higher air flow.

46 Claims, 14 Drawing Sheets

METHOD AND APPARATUS FOR CONTROLLING AIR FLOW IN A STRUCTURE

TECHNICAL FIELD OF THE INVENTION

The present invention pertains in general to a method and apparatus for controlling air flow in a structure, and more particularly, to a method and apparatus for controlling air flow using electromechanical control methods.

BACKGROUND OF THE INVENTION

Air conditioning and heating effectiveness in a home or office environment can be greatly increased by using remotely controlled dampers to direct air flow into specific zones of the structure. Conventional dampers typically use electromechanical devices to fully open or fully close moving panels (blades) or they consist of inflatable bladders that use air pressure to fully expand and vacuum to filly contract (reference U.S. Pat. Nos. 4,783,045; 4,662,269; & 4,552,196). These dampers typically provide on/off control of air flow inside the attached air ducts. Each damper is installed in series with an air duct serving a particular zone of the structure. The dampers are linked to a central control panel by dedicated wiring or by air hoses. The control panel is also connected to thermostats located in each zone that determine when heating, cooling or simple ventilation is needed. Some thermostats have access to date and time information and hence can be programmed to request heating or cooling only when the zone is normally occupied. The central idea is to efficiently direct conditioned air or ventilation only to those areas where it is needed, rather than attempting to sustain the entire structure simultaneously.

Even though these types of conventional zoning systems have been in use for over forty years in the USA, they are currently installed in less than 10% of the total residences. Among the principal problems associated with the slow acceptance of these systems are the high cost of installation in existing homes, the difficulty and added costs in maintaining constant air flow across the heating, ventilation and air conditioning (HVAC) system, the complexity of the control systems needed to interface with a user and the lack of flexibility in these systems that is needed to adapt to changing user needs.

Installation of a traditional zoning system in an existing structure consists of cutting open the existing ducts, installing dampers and running individual wiring harnesses from a central control panel to each damper. If metal ducts were originally installed, this installation process is slow and difficult to accomplish due to the rigidity of the duct material. If flexible ducts were used, it is much faster and easier, but the dampers must be independently supported. Each additional joint in the duct offers an added opportunity for conditioned air to leak out of the system. Dampers installed in an attic must be capable of operating reliably over a very wide range of temperatures. When damper failures do occur, the repairs must be accomplished in the often hostile environment of an attic or crawl space. Selection of a zone area in the structure is controlled by how the major ducts are originally installed. Zones are typically made up of adjoining rooms. Adding widely separated rooms to a zone often involves installing additional ducts and dampers.

When dampers are used to block or significantly reduce air flow in a duct, the total air flow across the HVAC system is reduced unless a bypass damper is installed to allow some air to be recirculated from the outlet back to the inlet or a variable speed blower motor is used. Typically the bypass damper is controlled by maintaining a constant air pressure at the outlet of the system. Studies have shown that reductions of total air discharge cross-sectional area of up to 30% can be accommodated without using a bypass damper. For constant ceiling heights, this equates roughly to restricting air flow to about 30% of structure area at a time.

In conventional zoning systems, each damper is typically connected by a five or six-wire cable to the control panel. The central control panel must be complex and sophisticated enough to resolve conflicts that arise for conditioned air in a multiple zone structure. The panel is connected to individual thermostats located in each zone of the structure. The control panel is programmed to sequence through a priority scheme that attempts to satisfy the user's HVAC needs, which generally change throughout their lifetime. This involves monitoring the calling requests from each of the zone thermostats and determining the priority associated with supplying conditioned air to each zone. This may involve reprogramming as the seasons change throughout the year.

There are millions of residences worldwide whose occupants could benefit significantly from a well designed, cost effective residential zoning system. Similarly, there are millions of individual offices and work areas that have similar problems in the delivery of conditioned air in a cost effective and efficient manner. In some ways, commercial and industrial needs are more demanding than residential needs due to the rapidly changing requirements of such facilities. The constant moving in and out of tenants in an office complex, the periodic shifting of work and office areas in a manufacturing plant, and the wide variations in tenant personal comfort needs present building maintenance personnel with overwhelming problems.

One possible solution to this problem is to place more control directly in the hands of the occupants of the conditioned structures. For commercial buildings employing sophisticated energy management systems, this simply means placing the lowest level of user control at individual offices or work areas. For residences, the occupants control the level of conditioning for each zone depending on their usage schedule. Variable air flow control, as opposed to simple on/off control, is more desirable because it provides more precise control that satisfies the exacting needs of each user.

Zoning for new commercial and residential construction is not particularly difficult in that the ductwork, thermostats, motorized zone dampers, and wire runs can be easily designed and installed during construction. The primary issue for new construction is the buyer's perceived payback period for recovering the added cost of purchasing and installing a zoning system. Adding zoning systems to existing structures can present formidable and costly problems. The advantages derived from retrofit zoning in terms of energy savings and added personal comfort are significant, however, and could be of benefit to a very large number of homeowners, apartment dwellers, tenants and office workers if an effective, low cost zoning system could be made available.

Retrofit Zoning Examples

A few examples of situations where retrofit zoning could be used effectively are summarized as follows:

A middle-aged couple owns or rents a large home and their children have moved out. They want to keep the large home but would like to conveniently close off that portion which is only used occasionally.

A family lives in the American Southwest and owns a tract home with a seriously undersized air conditioning system. Retrofit zoning could be used to direct the available conditioned air to occupied areas for improved comfort at reduced operating costs.

A family has a child away at college who regularly comes home on weekends. They would like to close off their bedroom during the week to lower utility costs.

A family has elderly parents who live with them and feel more comfortable with independent environmental control of their own living space.

An elderly couple is on a fixed income and would like to reduce energy costs by having unoccupied rooms closed off when not in use.

A family concerned about the environment is willing to use zoning as an energy conservation method to reduce pollution.

A tenant in an office building wishes to personally control their work space environment.

General Retrofit Zoning System Requirements

The following requirements are considered essential for retrofit zoning to become practical for residential or commercial use:

Changes or alterations to the existing ductwork must be minimal.

Activity in the attic or crawl space should be limited.

Typical homeowners should be capable of installing simple systems.

Air flow control should be an independent function that does not require direct connections to the HVAC system.

A comprehensive array of air flow control methods, including home automation, manual selection, temperature, time, or day of the week, should be supported.

Air flow control devices should be easily installed, reconfigured and maintained from inside the structure and not require any access to the attic or crawl space.

Air flow control devices must be available at a lower cost than existing dampers to allow more devices to be used to define a controlled zone.

The air flow control system described in this patent application meets all the above requirements.

SUMMARY OF THE INVENTION

The present invention disclosed and claimed herein comprises a method and apparatus for selectively controlling air flow through the ducts of an HVAC system. Basic system components are a flow control command device, a command decoder and one or more flow control valves which are electrically connected to the command decoder over a common low voltage flow control bus. Flow control commands originating from the flow control command device are converted to flow control signals by the command decoder. The flow control signals cause all connected flow control valves to move to a reference position and then move from the reference position to a position that produces the desired air. Flow control command devices communicate flow a control commands to the command decoder by direct connection or by wireless means.

In another aspect of the present invention, air flow is selectively controlled with minimal change in the total air flow through the HVAC system. The flow control signals cause one or more primary flow control valves to be moved to a known reference position and one or more complementary flow control valves to be moved to a complementary reference position. The flow control signals cause the primary and complementary flow control valves to be moved from their reference positions to complementary positions that produce the desired air flow. Thermostats located proximate to the flow control valves are connected in a logical AND configuration to control operation of the HVAC system. This allows control of the HVAC system to migrate to the thermostat receiving the higher air flow volume from it's associated duct.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
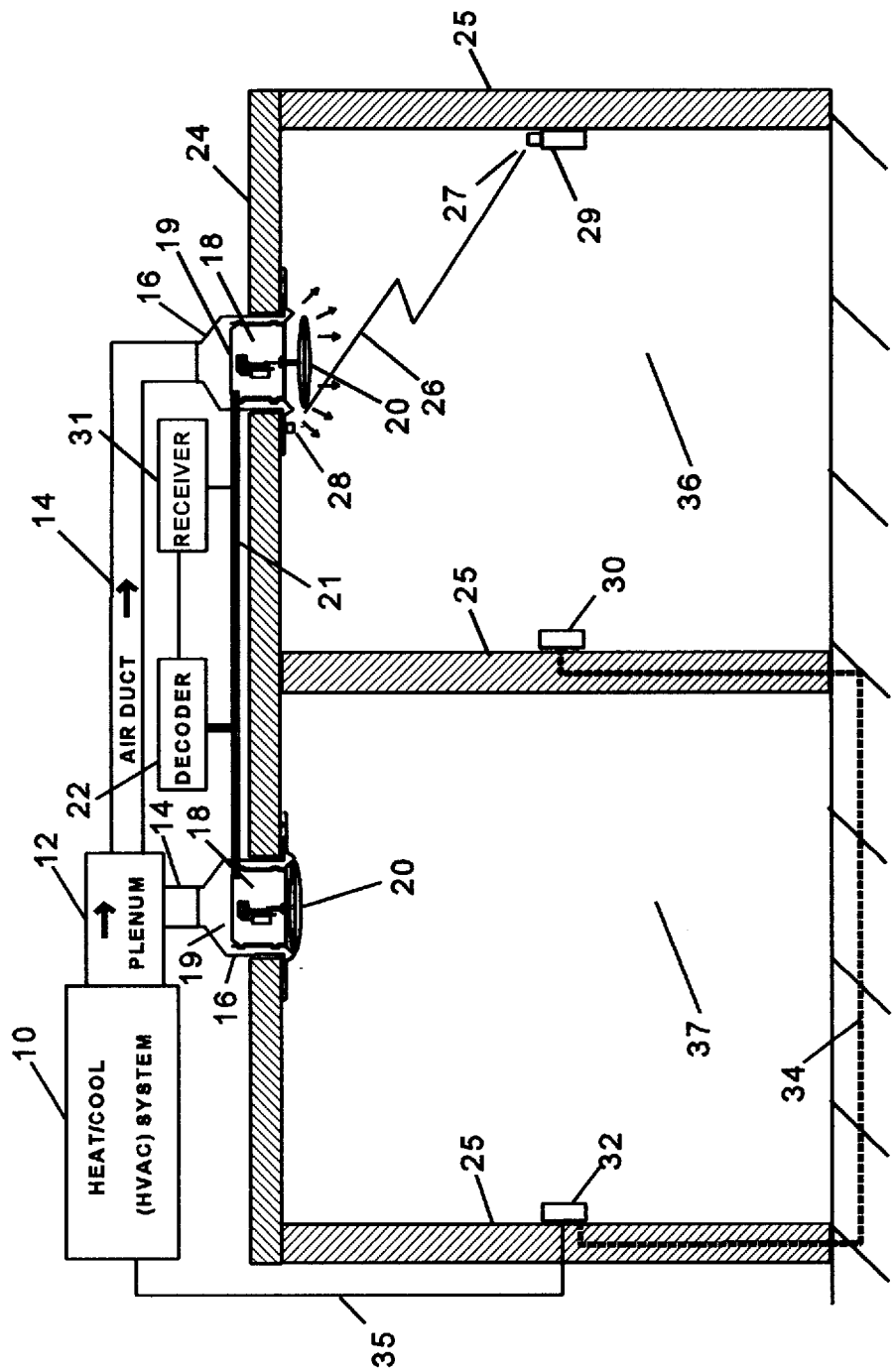
FIG. 1 illustrates a cross-sectional view of a house showing the system of the present invention.

Referring now to FIG. 1, there is illustrated a cross-sectional view of a structure showing the system of the present invention using wireless communications. A heating, ventilation and air conditioning (HVAC) system 10 is provided having an output plenum 12 connected to an air duct 14 which terminates into efferent ends 16 installed in the ceiling 24 of two adjoining rooms 36 AND 37. Installed inside each efferent end 16 are flow control valve assemblies 19 consisting of flow control valve plungers 20 that are positioned by flow control valve positioning systems 18. The flow control valve positioning systems 18 are connected together by a hardwired dedicated flow control signal bus 21 which is driven by a command decoder 22. The command decoder 22 is controlled by a flow control command device 29 which is mounted on the wall 25 of the room 36. The flow control command device 29 allows the user to select a desired air flow.

Communication between the flow control command device 29 and the command decoder 22 is via wireless means 26 from a remote transmit device 27 to a receiver transducer 28 located on the outer surface of the flow control valve assembly 19. Receive transducer 28 is connected via flow control signal bus 21 to a remote control receiver 31, which is directly connected to the command decoder 22. A slave thermostat 30 is installed on the wall 21 of the room 36. The slave thermostat 30 is connected via cable 34 in series with master thermostat 32 located on the wall 25 of the room 37. Master thermostat 32 controls the HVAC system 10 through cable 35 in conventional fashion. Slave thermostat 30 is connected to the power source and it provides power to the master thermostat 32 only when it is calling. This connection allows the master thermostat 32 to start the HVAC system 10 when the master thermostat 32 and the slave thermostat 30 are both calling. Air flows from the HVAC system 10 through the plenum 12 into the air duct 14 through the open flow control valve assembly 19 into the room 36. The flow control valve assembly 19 located in the room 37 is closed and no air flows into the room 37. This lack of air flow into room 37 causes master thermostat 32 to always be calling. Therefore, slave thermostat 30 controls operation of the HVAC system 10. This configuration allows the temperature of room 36 to be controlled independently without any direct connections between the air flow control system and the HVAC system.

Flow Control Valve

Figure 2:
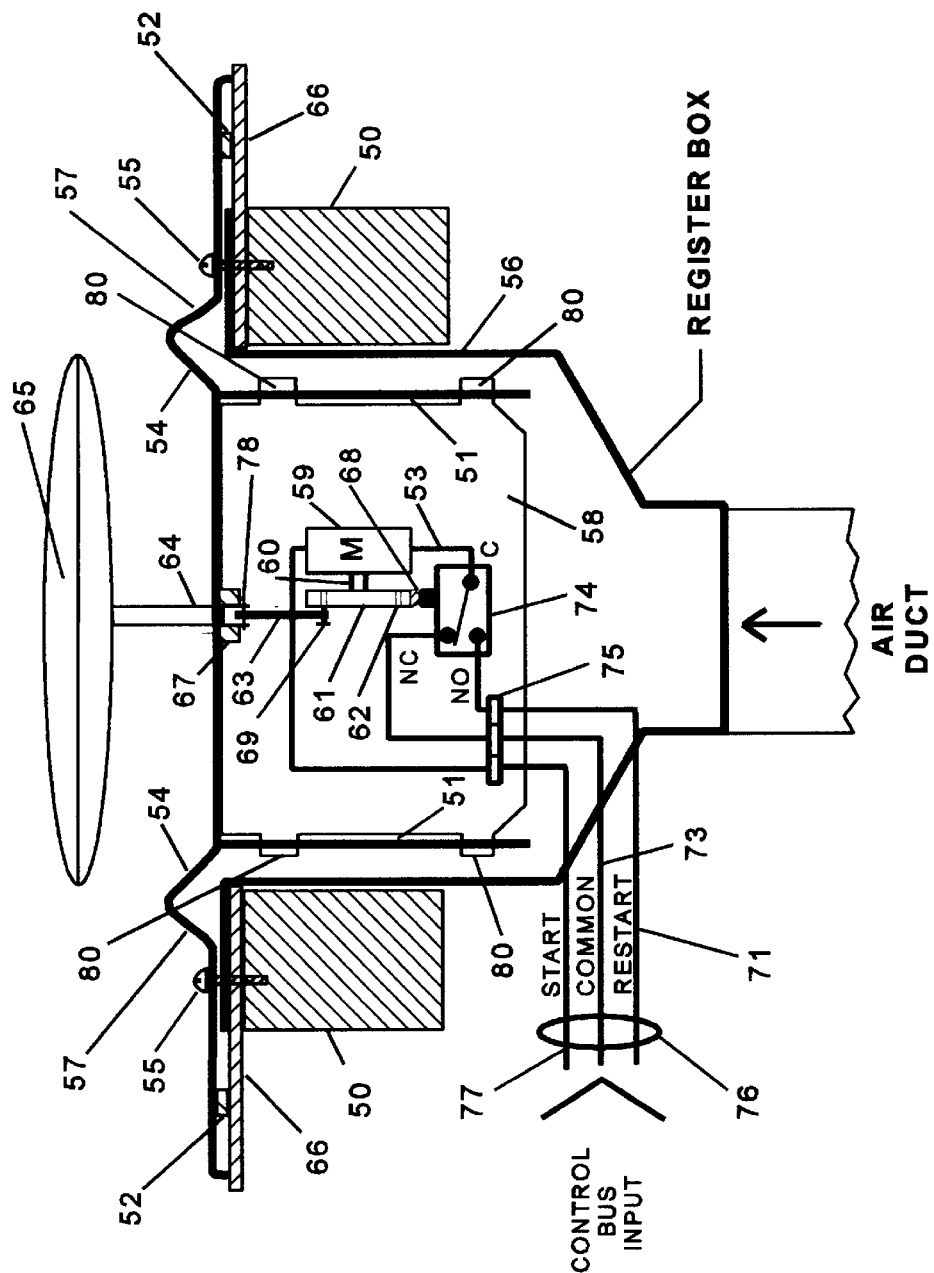
FIG. 2 illustrates a cross-sectional view of the flow control valve mechanism.

Referring now to FIG. 2, there is illustrated a diagrammatic view of the flow control valve mounted in register box 56 and attached between two supports 50 by mounting screws 55. A cover plate 57 is provided to fit over register box 56 and replace a standard diffuser. No alterations to the existing ductwork are required. The circular shape of the valve seat 54 acts to properly diffuse exiting air into a room. An air tight seal 52 is provided between the cover plate 57 and the wall 66. A printed circuit board (PCB) 58 is provided to which is mounted a low voltage AC motor 59, a single-pole-double-throw (SPDT) cam operated microswitch 74, a connector bloc 75 and a shaft guide 67. A flow control valve plunger 65 is provided having an elliptical shape and shaft 64 passing through shaft guide 67. Special tabs 80 on PCB 58 are designed to snap into slots in the two mounting strips 51 for attaching the PCB assembly 58 to cover plate 57. A flow control bus 76 is provided having three control wires, START 77, COMMON 73, and RESTART 71. Motor 59 is provided with two electrical inputs and an output shaft 60 with an attached circular crank 61. Microswitch 74 is provided with a common (C) electrical input and both a normally closed (NC) output and a normally open (NO) output. Crank 61 has a short-duration cam 68 which activates microswitch 74 at one point in a single revolution of crank 61. This is called the reference point for crank 61.

One terminal of motor 59 is connected to the start line 77 of flow control bus 76. The second terminal 53 of motor 59 is connected to the common (C) terminal of microswitch 74. The NC terminal of microswitch 74 is connected to the common line 73 of flow control bus 76. The NO terminal of microswitch 74 is connected to the restart line 71 of flow control bus 76.

Activation of the start line 77 of flow control bus 76 causes ac current to flow from the start line, through motor 59 and the NC contacts of microswitch 74 to the common line 73 of flow control bus 76. Motor 59 then runs until microswitch 74 is forced to its normally open (NO) position by the action of short-duration cam 68. Motor 59 then stops and remains at its reference position for a time sufficient for all motors attached to flow control bus 76 to reach their own reference positions and stop. At this time, the restart 71 line of flow control bus 76 is activated, providing a secondary return path for motor 59 current. Motor 59 then restarts and runs until both the start line 77 and the restart line 71 of flow control bus 76 are deactivated. The time interval from activation of the restart line 71 to deactivation of the start line 77 of flow control bus 76 is set by the position command. This time interval sets the desired final position of the flow control valve plunger 65 linked to motor 59 as herein described. Crank 61 has two attachment positions, one labeled primary 62 and the other labeled complement 69, each placed near its perimeter and 180 degrees apart. A connecting rod 63 is provided having two ends. One end of connecting rod 63 is attached to either the primary attachment point 62 or the complement attachment point 69 of crank 61. The other end of connecting rod 63 is attached to shaft 64 of flow control valve plunger 65 by connecting pin 78. The circular opening in the cover 57 has a convex surface 54 around its perimeter to match the elliptical shaped flow control valve plunger 65. This provides a good seal when the flow control valve plunger 65 is fully closed, and good aerodynamic compliance and reduced air flow turbulence as the flow control valve plunger 65 is opened.

The rotation of crank 61 acts through connecting rod 63, pin 78, and shaft 64 to move flow control valve plunger 65 and thus increase or decrease air flow. From a closed reference position, flow control valve plunger 65 will travel to a fully open position with 180 degrees rotation of crank 61. The rotation of crank 61 to its reference position causes flow control valve plunger 65 to move to either its fully closed position or its fully open position depending on which connection point of crank 61 is used to attach connecting rod 63. The attachment at 69, as depicted in FIG. 2, causes the flow control valve plunger 65 to stop at the fully open position when short-duration cam 68 of crank 61 activates the microswitch 74. Moving the attachment point of connecting rod 63 from position 69 to position 62 of crank 61 acts to position valve 65 to its fully closed position when crank 61 is at its reference position. Flow control valves with a connecting rod 63 attached at the primary attachment position 62 are closed at the reference position and are herein described as primary flow control valves. Flow control valves with a connecting rod 63 attached at the complement attachment position 69 are open at the reference position and are herein described as complementary flow control valves.

Since all flow control valve positioning is relative to a self-achieved reference position, synchronization of all flow control valves connected to a common bus is automatic and new devices may be added to the bus without regard to existing crank 61 positions. Positioning of flow control valves is very precise because the AC motor 59 is a synchronous timing (clock) motor that is locked to the AC power line frequency. Although an AC motor is shown in the Figure, it should be understood that a DC motor or a pulsed DC (stepper) motor could be used with appropriate changes in the drive circuitry. Once positioned, flow control valves will remain stationary until another legitimate positioning cycle is initiated. The Command decoder acts to insure that the flow control valves are not re-positioned after power outages by insuring that power is not applied to the bus at power-up.

Figure 3:
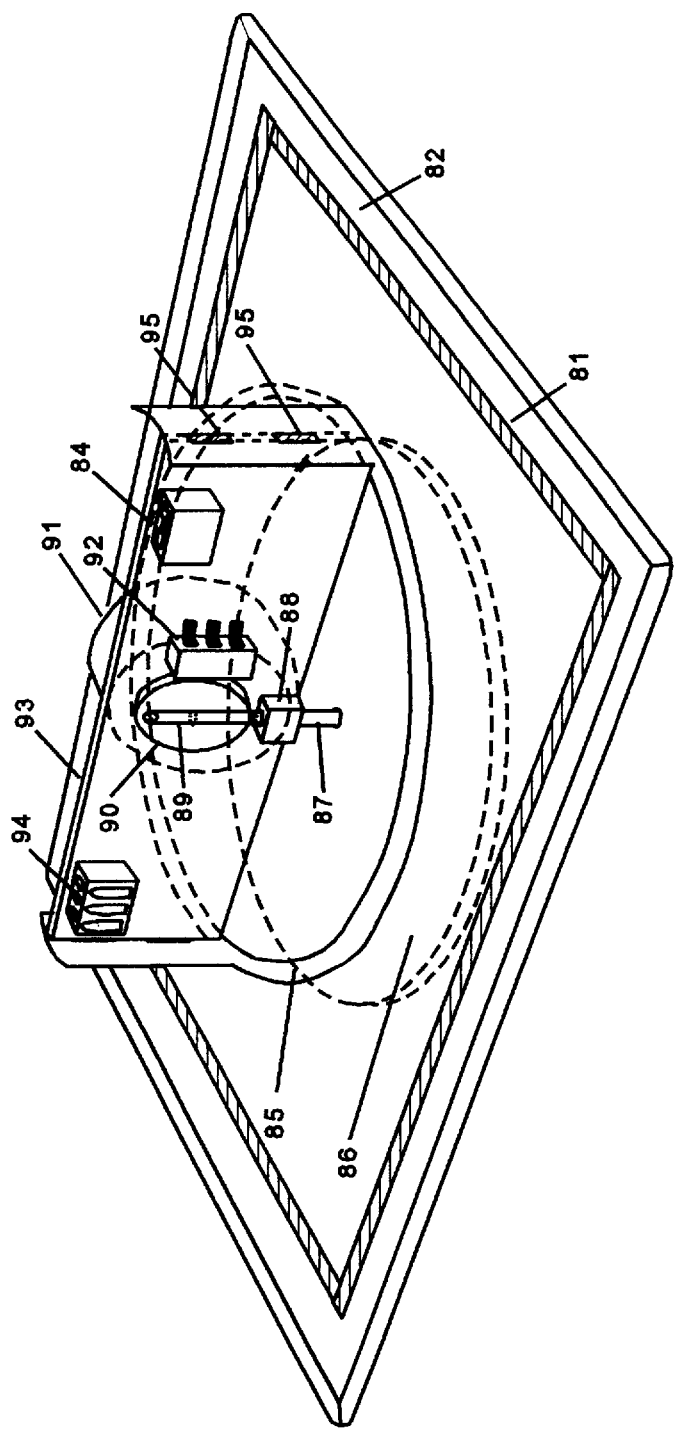
FIG. 3 illustrates a 3-dimensional pictorial view of the flow control valve.

Referring now to FIG. 3, there is illustrated a pictorial view of a flow control valve assembly that is designed to be inserted into a register box. A front plate 82 mounts against the wall or ceiling and uses an open cell rubber seal 81 to prevent air from escaping at the surface of the wall or ceiling where the register box is mounted. The flow control valve plunger 86 is elliptical in shape with a compatible valve seat 85 that exhibits aerodynamic compliance to reduce air flow turbulence and noise. The flow control valve plunger 86 is connected to the combination crank and cam assembly 90 by a round shaft 87, which is held in position by a guide assembly 88. The round shaft 87 is connected to a flat connecting rod 89, which connects to the combination crank and cam assembly 90. As the combination crank and cam assembly 90 is rotated by the motor 91, the flat plate 89 is connected to the round shaft 87 in a clevis arrangement with a pin that is not shown in the figure. This arrangement allows the round shaft 87 to be moved in a vertical motion as the combination crank and cam assembly 90 rotates. This vertical movement causes the flow control valve plunger 86 to control the amount of air that passes through the flow control valve assembly. The electromechanical components are mounted on a printed circuit board 93 which is held in place by two rectangular slots 95 that accommodate two compatible ears on each end of the printed circuit board 93. The printed circuit board 93 also contains the microswitch 92 which determines the reference position of the combination crank and cam assembly 90. The screwdriverless connection terminal 94 provides a connection point to access the flow control bus. The modular jack 84 also provides a connection point to the flow control bus for the receive transducer, which is not shown.

Flow Control Valve Timing

Figure 4:
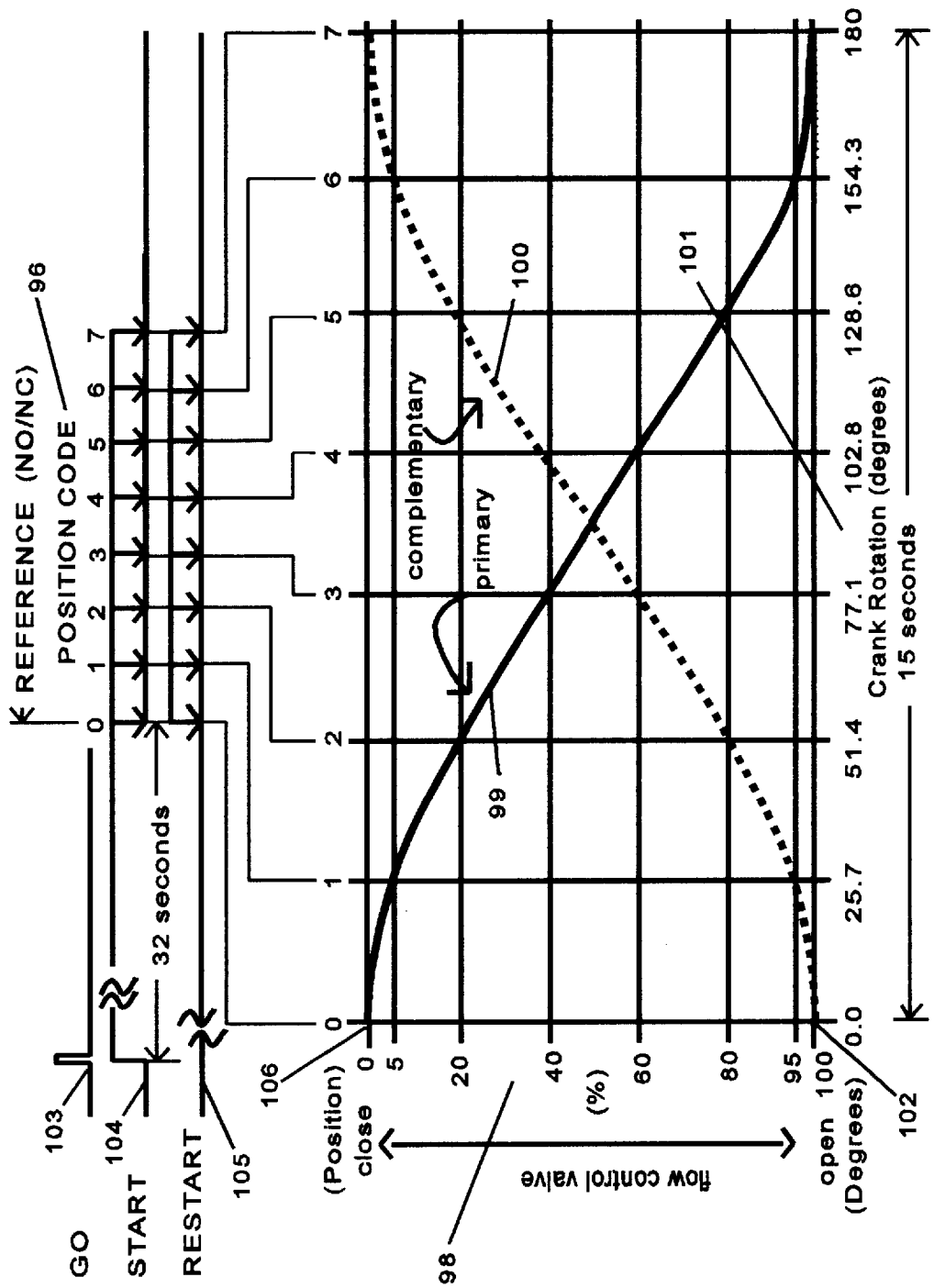
FIG. 4 illustrates the timing and flow control valve positioning sequence as a function of the position code received.

Referring now to FIG. 4, there is illustrated the overall timing diagram during a re-position cycle for a flow control valve. Receipt of a proper GO 103 signal results in activation of the START 104 signal. At this time, all flow control valves are enabled to move to their respective reference positions. All primary flow control valves will move to a fully closed initial position 106 and all complementary flow control valves will move to a fully open initial position 102 as indicated at position 0 of the timing diagram. The RESTART 105 signal is then activated enabling all flow control valves to begin moving from their respective reference positions. The length of time the flow control valves are allowed to move off reference is set by the position code 96. Flow control valves will remain at their reference positions for a position code of binary zero and will move to maximum displacement for a position code of binary seven, assuming a 3-bit, 8-position code. Any length position code may be used to provide more or less control resolution. Primary flow control valves follow sinusoidal curve 99, moving incrementally from fully closed to fully open as the position code 96 is changed from binary zero to binary seven.

Complementary flow control valves follow sinusoidal curve 100, moving incrementally from fully open to fully closed as position code 96 is changed from binary zero to binary seven. The approximate air flow percentage 98 and the corresponding crank rotational angle 101 are indicated for each discrete position code. The timing depicted in FIG. 4 is set for a 2 RPM flow control valve motor which obviously could be adjusted for other motor speeds. The only requirement is that n discrete time intervals occur during the time it takes the flow control valve crank to move through one-half revolution where n is any binary number. It should be noted that the movement of the flow control valve is non-linear especially in the smallest and largest position code ranges. If desired, linear displacement may be accomplished by using devices such as a linear variable displacement transducer to replace the motor and crank assembly.

Complementary Flow Control Valve Functional Description

The practical application for primary/complementary air flow control in a typical structure is steering air flow into occupied zones while simultaneously reducing air flow into unoccupied zones. This is especially helpful where undersized HVAC systems have been installed. This technique is generally effective in reducing operating costs while improving comfort levels.

Figure 5:
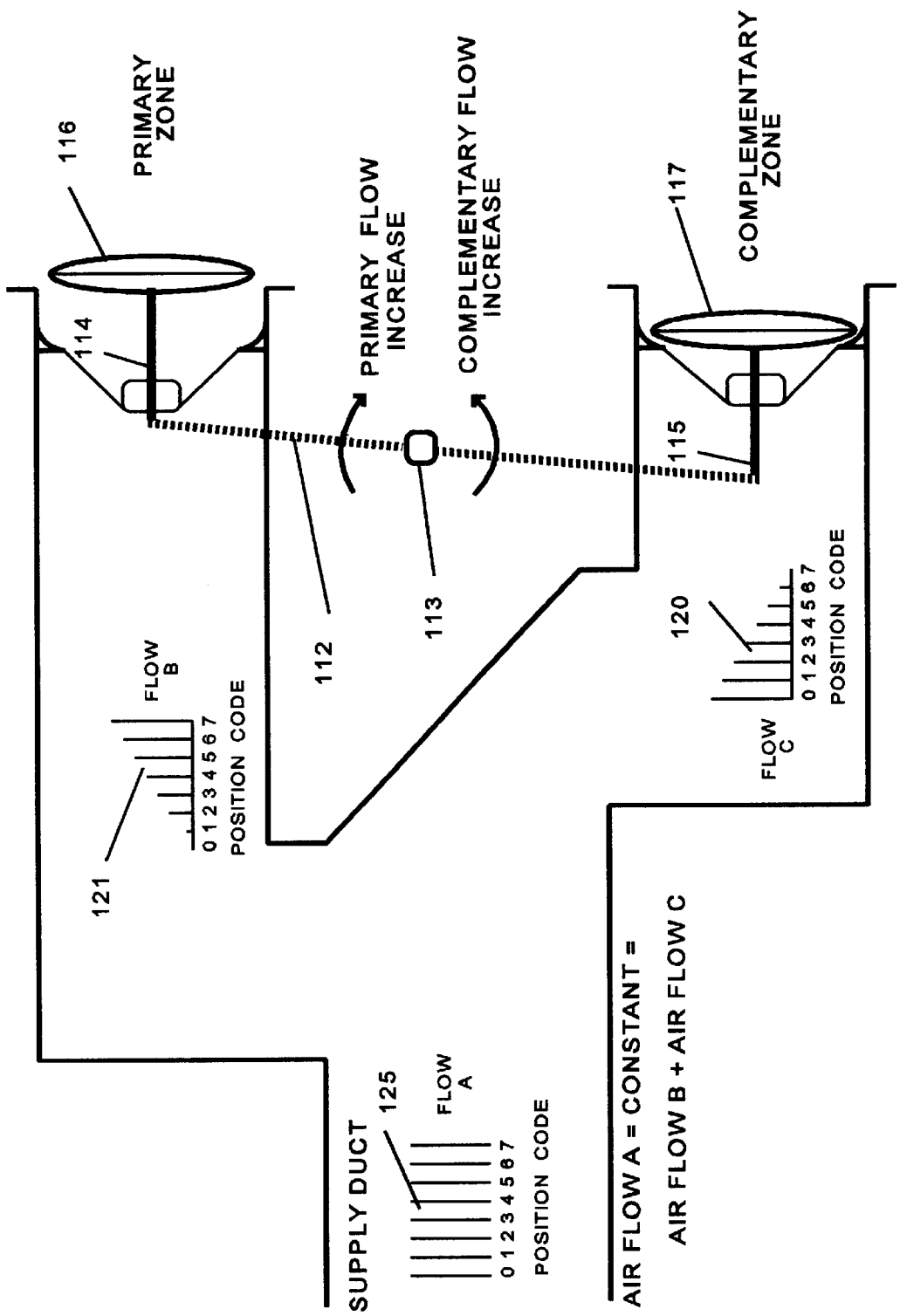
FIG. 5 illustrates a mechanical model depicting primary and complementary air flow through two flow control valves.

Referring now to FIG. 5, there is illustrated a simplified mechanical equivalent of the complementary flow control valve distribution system previously described. It provides a useful analogy to aid in a further understanding of the system. Mechanical linkage 112 has one end attached to shaft 114 of primary flow control valve 116 and the other end attached to shaft 115 of complementary flow control valve 117. The center point of linkage 112 is pinned at point 113. Rotation of linkage 112 in a clockwise direction causes the primary flow control valve 116 to move toward its open position and causes complementary flow control valve 117 to move toward its closed position. Rotation of linkage 112 in a counter-clockwise position causes primary flow control valve 116 to move toward its closed position and causes complementary flow control valve 117 to move toward its open position. At any position of linkage 112, the position of flow control valves 116 and 117 is complementary, with one flow control valve closed down by the same distance that the other valve is opened up. In this manner a constant volume of supply air can be shared in any proportion between two zones by rotating linkage 112 to a fixed position. In the system of the present invention, complementary positioning of flow control valves 116 and 117 is accomplished by electronic means. Flow chart B 121 indicates the relative magnitude of primary air flow as the linkage 112 is rotated clockwise in eight steps from a fully closed flow control valve position to a fully open flow control valve position. The corresponding electronic control is achieved by incrementing the position code from binary zero to binary seven. Flow chart C 120 indicates the relative magnitude of complementary air flow for the same positions of linkage 112. Flow chart A 125 indicates a constant air supply volume independent of the position of linkage 112 ( or the position code).

Complementary Zoning System Example

Figure 6:
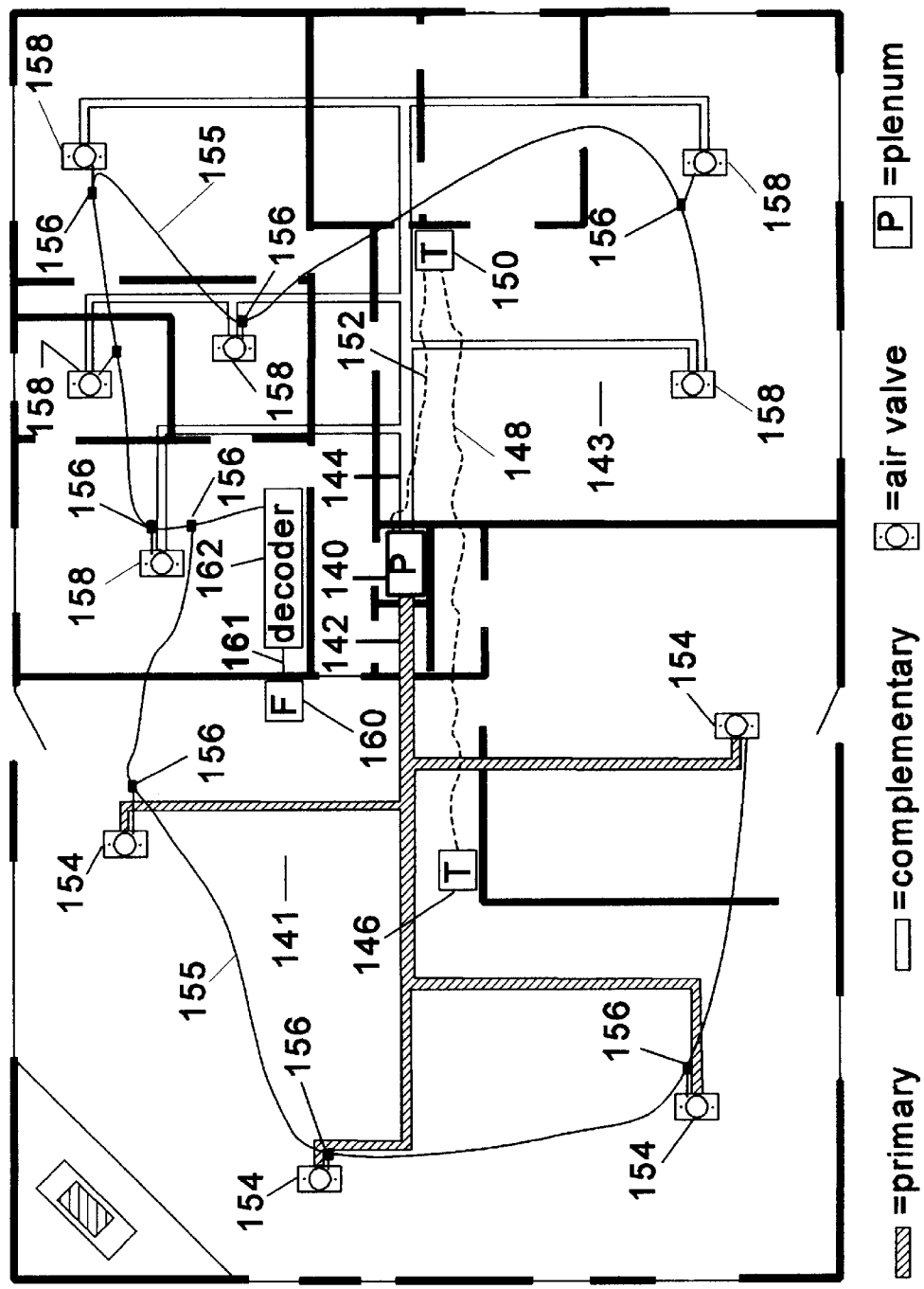
FIG. 6 illustrates a diagrammatic view of the system of the present invention.

Referring now to FIG. 6, there is illustrated an overhead cutaway view of the systems of ducts, vents, flow control valves and plenums in a typical house with two different flow control zones utilizing the system of the present invention. A central plenum 140 is provided having an HVAC air duct 142 which provides air from the plenum 140 to a first primary zone 141 and another HVAC air duct 144 which provides air from the plenum 140 to a second complementary zone 143. Although this example shows two zones composed of contiguous rooms, it should be noted that any room may be included in either zone because air flow control is implemented at the room level. The design of the zones in this example is controlled by the type (primary 154 or complementary 158) of flow control valve that are installed in each room. Flow control valves 154 are provided to control the air flowing into the rooms of the first zone 141. These flow control valves 154 are connected to the command decoder 162 via a dedicated flow control signal bus 155. The dedicated flow control bus 155 is tapped near each flow control valve 154 using quick connect taps 156 which allow the dedicated flow control signal bus 155 to be connected to each flow control valve 154. Similarly, the flow control valves 158 control the air flowing into the rooms of the second zone 143. The flow control valves 158 are connected to the command decoder 162 via the dedicated flow control bus 155 via quick connect taps 156. Air flow control in each zone of the house is controlled by a flow control command device 160 that is directly connected to the command decoder 162 by cable 161. The flow control command device 160 produces a position code and a GO signal that is transferred to the command decoder 162. The command decoder 162 produces flow control signals which are sent to the flow control valves 154 in the first zone 141 and the flow control valves 158 in the second zone 143. The flow control valves 154 in the first zone 141 are positioned to a primary reference position and the flow control valves 156 in the second zone 143 are positioned to a complementary reference position by the flow control signals. The command decoder 162 is programmed to allow adequate time for all flow control valves 154 in the first zone 141 and all flow control valves 156 in the second zone 143 to reach their reference position from a worst case position that requires the maximum positioning time. The command decoder 162 also allows for worst case positioning speed errors to be accommodated. Once reference positioning is completed, the command decoder 162 produces flow control signals that position the flow control valves 154 in the first zone 141 to a desired position and the flow control valves 156 in the second zone 143 to a complementary position. Control of the HVAC system is accomplished by a master thermostat 150 located near the center of the second zone 143 which is connected by a cable 152 to the HVAC system, not shown in the figure, but contained within the same area occupied by the plenum 140. Master thermostat 150 is also connected by a cable 148 to slave thermostat 146 located near the center of the first zone 141. Slave thermostat 146 is connected in series with master thermostat 150. Slave thermostat 146 is connected to the power source and it provides power to the master thermostat 150 only when it is calling.

Air Flow Control System

Figure 7:
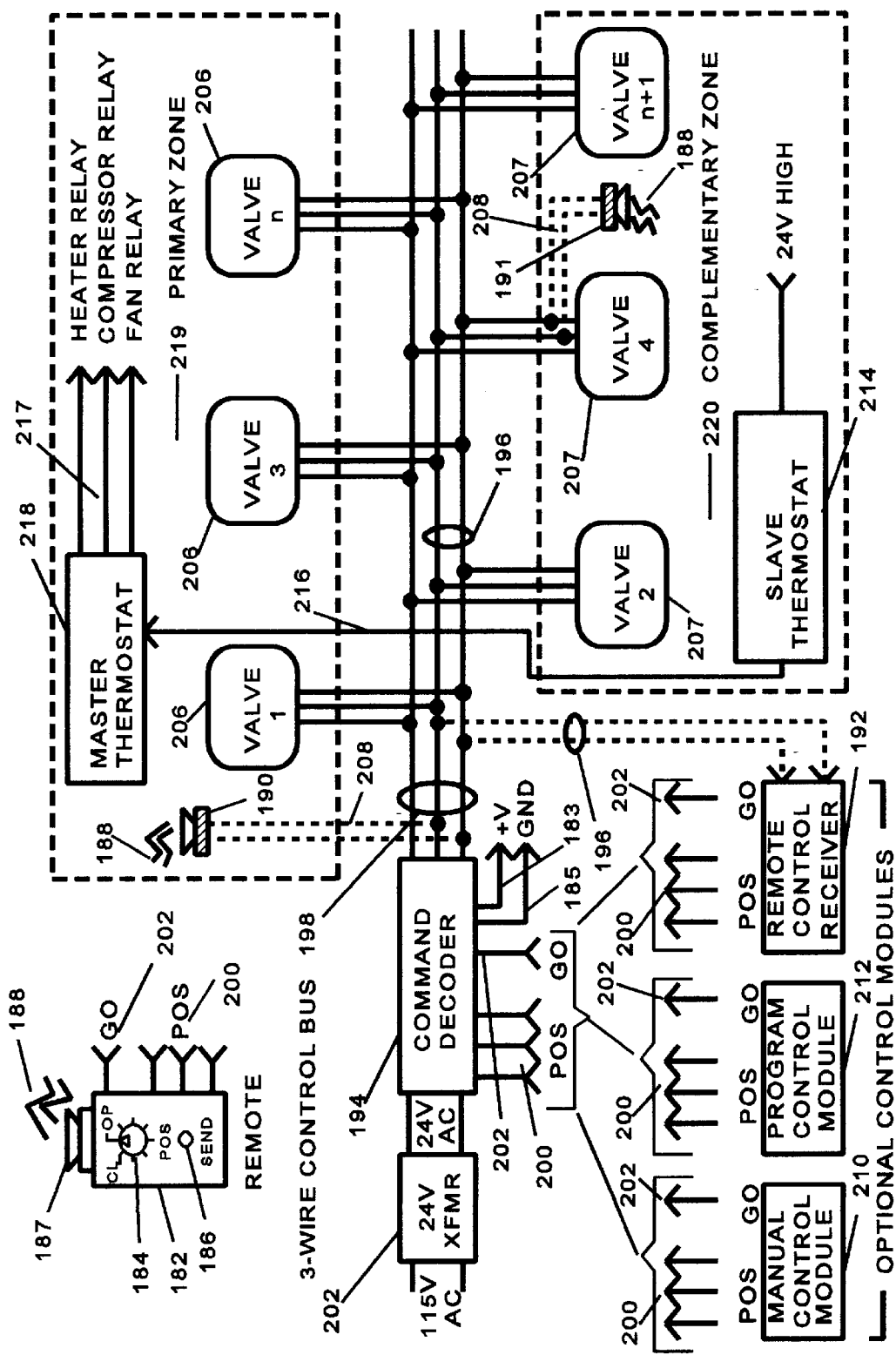
FIG. 7 illustrates a block diagram of the control system and optional control modules that may be used to adjust air flow.

Referring to FIG. 7, there is illustrated a block diagram of the air flow control system and the optional control modules that make up the air flow control system. Flow control valves 206 in the primary zone 219, numbered 1 through n, and flow control valves 207 in the complementary zone 220, numbered 2 through n+1 are identical and act to modulate air flow in response to signals on a 3-wire flow control signal bus 198. Primary flow control valves 206 or complementary flow control valves 207 are mounted either within a duct supplying conditioned air to a selected zone of a structure or more preferably within individual register boxes associated with the controlled zone. All valves are electrically driven to one of eight positions in response to signals on the common 3-wire flow control bus 198. Flow control valves 206 associated with the primary zone 219 all respond to position control from a closed reference position while flow control valves 207 associated with the complementary zone 220 all respond to position commands from an open reference position. As primary flow control valves 206 are opened, simultaneously complementary flow control valves 207 are closed. In this manner, a fixed volume of air is proportionally steered to each zone depending on the digital position code 200 input to the command decoder 194.

It should be noted that all valves may be connected as primary or complementary to simply regulate the volume of air flow delivered or to completely shut off air flow to a smaller area of a structure when it is not being used for prolonged periods. The number of flow control valves used in this configuration should be determined such that the total air discharge cross-sectional area is not reduced by more than about 30%. For those installations where reductions of more than 30% in the discharge cross-sectional area are desired, a complementary bypass flow control valve connected between the plenum outlet and the HVAC system air inlet may be used to maintain the minimum air flow rate required through the HVAC system.

When a GO input 202 is momentarily set to a logical high state, the command decoder 194 energizes the 3-wire flow control bus 198 to first cause all connected valves to move to their respective reference positions. From the reference point, all valves then move an integral number of position steps (0 through 7) defined by the 3-bit digital position code 200 input to the command decoder 194. Primary flow control valves 206 open up from their fully closed reference position while complementary flow control valves close down from their fully open reference position. By properly setting the digital position code 200, a given volume of conditioned air can be shared between two zones in any desired proportion, including fully closed and fully open in either zone. Calling for more air flow in one zone automatically reduces air flow in the other zone in like proportion.

One method of controlling the air flow control system is via a remote transmit device 182, which is a battery operated, wireless, hand-held, table or wall mounted unit used to transmit flow control commands to an associated remote control receiver 192. Flow control commands from the remote transmit device 182 are generated in response to manual selection of the desired flow rate by setting the position switch 184 and depressing push-button Send switch 186. Flow control commands modulate an ultrasonic carrier 188 which is coupled to the air through a transmit transducer 187. Receive transducers 190 and/or 191 convert ultrasonic pressure waves from the transmit device 182 to electrical signals which are conducted through transducer bus 196, which is part of the 3-wire flow control bus 198. Remote control receiver 192 has its input terminals connected to transducer bus 196 and acts to amplify, demodulate, and convert the flow control commands to a digital position code 200 and a GO command 202 for input to the command decoder 194.

Command decoder 194 has three inputs and three outputs. The first input is 24 VAC power from transformer 202. The second input is a 3-bit binary logic position code 200 used to set air flow volume. The third input is a GO signal 202 used to initiate an air flow change. One output drives a 3-wire flow control signal bus 198 to which all system flow control valves 206 and 207 are attached. Flow control bus 198 provides the necessary electrical drive power to each connected flow control valve. A second output +V 183 provides operating voltage for any associated control module and a third output GND 185 provides signal and power return for associated control modules.

Receive transducer 190 may be located at any convenient location, but the preferred placement is with a flow control valve assembly located in the room where the transmit device 182 will be operated. This assures an adequate acoustic path for ultrasonic communications between transmitter 182 and receiver 192 with no room wiring, penetrations, or alterations required. If the homeowner desires control from a second room, then a remote receive transducer 191 is installed so that it has a good acoustic path to that room. A small cable 208 is used to connect each transducer 190 and/or 191 to the transducer bus 196. All bus wiring would normally be installed within the attic or crawl space. After wiring is completed in the attic or crawl space, the primary flow control valves 206 and the complementary flow control valves 207 are installed, modified and maintained from the air conditioned rooms of the structure. Routing the flow control bus 198 through each register box in the structure allows complete freedom to re-define and compress or expand zones without having to access the attic or crawl space.

Another method of controlling the system is via a manual control module 210, having a logical position output 200 and a GO 202 signal for hard-wired input to the command decoder 194. Manual control module 210 provides an optional manual control of air flow and replaces wireless control modules 182 and 192. Manual control module 210 would normally be wall mounted at any convenient location within a structure and hard wired to command decoder 194.

Another method of controlling the system is via a program control module 212 having a logical position output 200 and a GO 202 signal for hard-wired input to command decoder 194. Program control module 212 provides an alternate time-of-day and day of week control of air flow. Specific flow rates (position codes) are set for different programmed time periods during a day and selected days of the week. Program control module 212 is wired directly to command decoder 194 or optionally plugged into or integrated with remote transmitter 182 which acts through receiver module 192 to provide automatic programmable flow rates at specific time periods of the day and on specific days of the week.

The air flow control system adjusts the volume of air delivered into a designated zone on command. It does not directly control the HVAC system components but serves as an overlay to control and manage the distribution of conditioned air generated by the HVAC system. It is important that thermostatic control of the HVAC system be maintained as air flow is dynamically shifted within a structure. It is highly beneficial if thermostatic control of the HVAC system is made to automatically shift to the zone receiving the highest air flow, because this is generally the occupied zone where temperature control is needed most.

Referring again to FIG. 7, therein is shown two thermostats which act to control the HVAC system. Master thermostat 218 is located in the primary zone and connected via cable 217 to the HVAC system in a conventional manner to control the heater relay, compressor relay, fan relay, and reversing valve for heat pumps. Rather than receiving its input control voltage 216 (24 Volt high) directly from the HVAC system low voltage transformer, master thermostat 218 receives its operating voltage through slave thermostat 214 located in the complementary zone. Slave thermostat 214 is connected in normal fashion to the HVAC system low voltage transformer 24 Volt high and causes this voltage to be applied to master 218 only when the slave thermostat 214 has its zone temperature outside the narrow "set point" temperature range, e.g. only when it is "calling." Slave thermostat 214 is not connected to the HVAC system but exercises control by enabling master thermostat 218 when it is "calling." Thus both thermostats must be "calling" in order to enable the HVAC system to add or subtract heat from the conditioned air supply. When the air supply to either zone is significantly reduced or totally shut down, the zone temperature will shortly move outside the set-point window of its associated thermostat, causing it to assume a continuous "calling" state. This action enables the other zone thermostat to control the HVAC system to maintain its associated zone temperature within the "set-point" range.

Shifting the bulk of the conditioned air to the other zone at a later time will reverse this action and transfer HVAC control to that zone thermostat. In this manner, HVAC system control is transferred automatically to the zone receiving the highest air volume. Depending on area and heat loss differences between the two zones, it is possible to set air flow so that temperature equilibrium is temporarily established for both zones. In this state, both thermostats must be "calling" (the zone temperature is outside the "set-point" window) to turn the HVAC system on. The first zone to be "satisfied" (the zone temperature is within the "set-point" window) will turn the HVAC system off. Generally, temperature equilibrium will not be maintained and one zone thermostat will gain control of both zones. This is similar to most residential HVAC systems where a single thermostat controls the entire residence.

Manual Control Module

Figure 8:
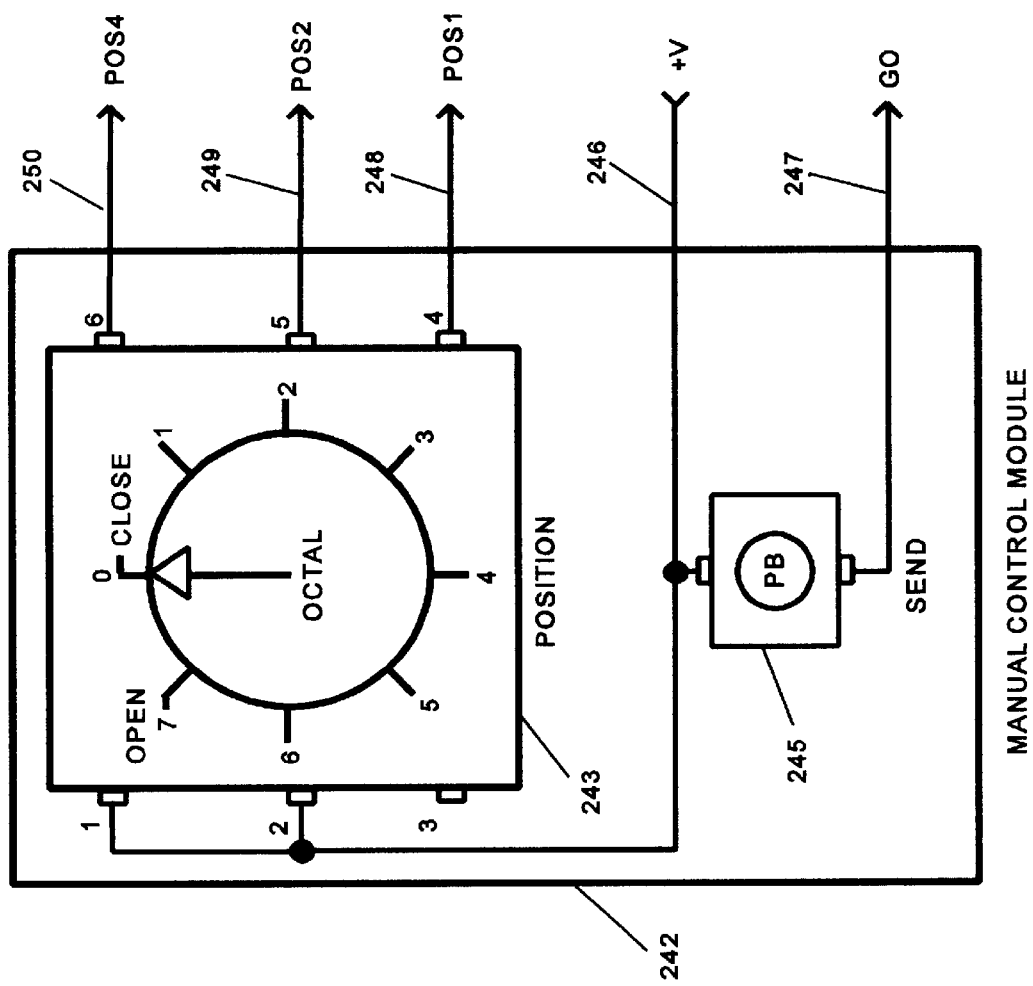
FIG. 8 illustrates a block diagram of the manual flow control module.

Referring now to FIG. 8, there is illustrated a block diagram that contains a more detailed description of the manual control module 242. An 8-position binary coded octal position switch 243 is used for selection of the desired air flow and a momentary push-button Send switch 245 is used to initiate a positional change of the flow control valves. The switches can be included as an integral part of the command decoder or can be placed remotely at any convenient location, such as a wall plate switch within one of the zones. Connection to the command decoder is by means of a small multi-conductor cable, such as a standard thermostat cable or a modular telephone cable. Position switch 243 has one power input +V 246 and three position code outputs, 248, 249, and 250. Push button send switch 245 has one power input +V 246 and one output GO 247. Power input +V 246 is applied to the input terminals 1 and 2 of position switch 243. Position switch 243 is internally constructed so as to provide a unique binary switch closure sequence at position code outputs 248, 249, and 250 for each position setting. POS4 output 250 represents the most significant bit of the output position code and POS1 248 representing the least significant bit of the output position code. The binary position output code for each setting of position switch 243 is shown below.

| Position Switch Setting | Position Output Code | | |
|---|---|---|---|
| | POS4 | POS2 | POS1 |
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

Momentary push button Send switch 245 is activated to generate a GO command 247 to cause the command decoder to update all connected flow control valves according to the position code at the output of position switch 243.

Program Control Module

Figure 9:
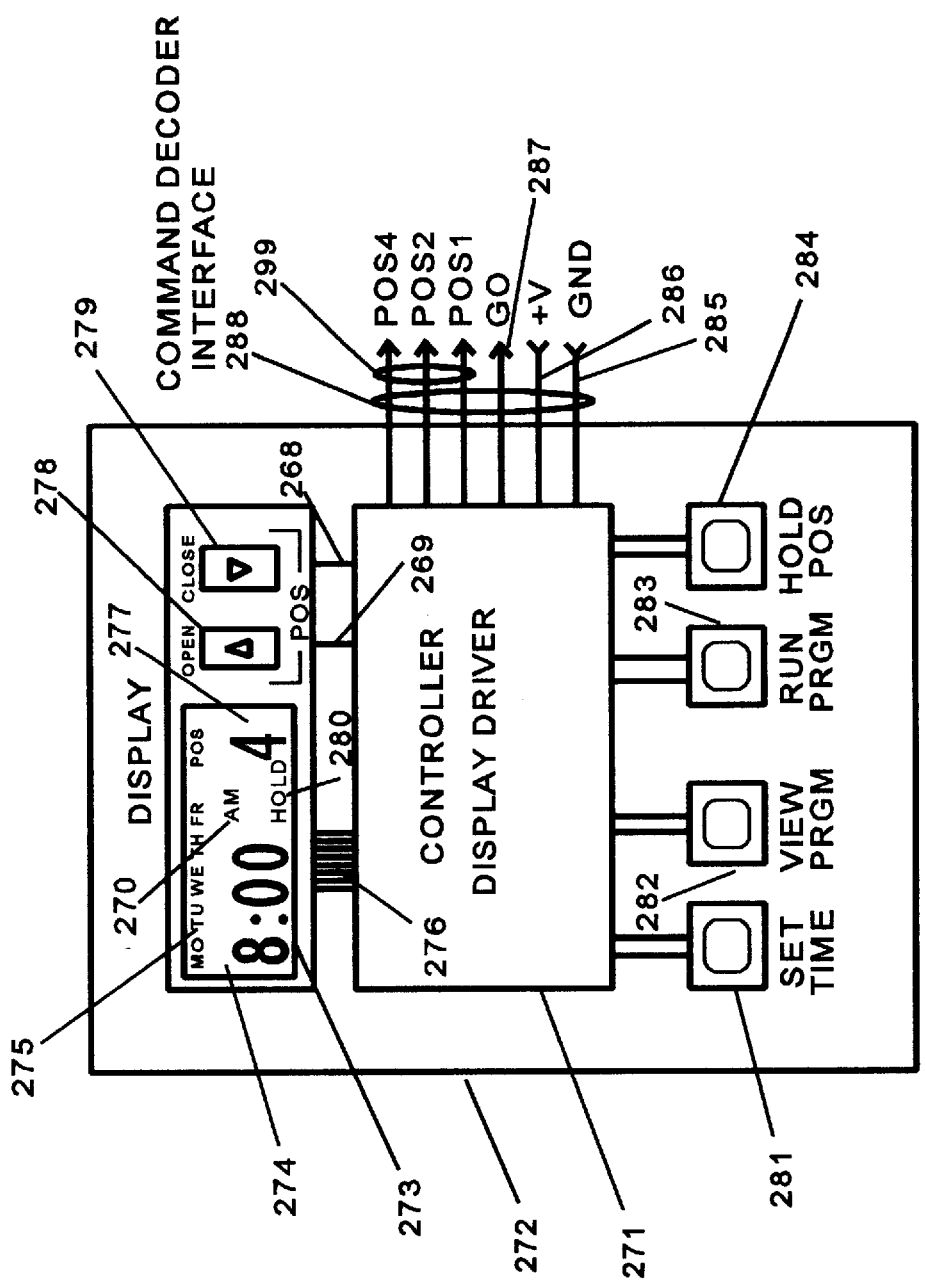
FIG. 9 illustrates a block diagram of the programmable set-back flow control module.

Referring now to FIG. 9, there is illustrated a block diagram of a program control module 272 for use with the command decoder. Programming air flow by time of day and day of week is initiated by the program control module 272 which allows the user to select a desired air flow rate for each programmed time interval during a 24-hour day, with provision for separate weekday and weekend programs. This device functions much like current programmable set-back thermostats except that air flow replaces the normal set-back temperature variable. The program control module 272 is compatible with the same multi-conductor cable used by the manual control module. Upgrading from manual control to programmed control is easily accomplished by simply changing out the wall mounted unit. No changes are required to the command decoder or to the flow control valves.

A uniquely programmed integrated circuit (IC) controller and display driver 271 is provided having manual control inputs 281, 282, 283, and 284, power inputs 286 and 285, display driver outputs 276, position control inputs 269 (increment) and 268 (decrement), position code output 299 and a GO output 287. A display panel 273 is provided having alphanumeric indicators for week/weekend days 275, time of day 274, AM/PM time 270, flow control valve position code 277, and an override HOLD position indicator 280. Open switch 278 is a momentary contact switch used to increment the position code 277. Close switch 279 is a momentary contact switch used to decrement the position code 277. In operation, the program control module 272 is programmed by momentarily depressing the view program switch 282; then incrementing set time switch 281 until the desired start time of day 274, AM/PM time 270, and day of week 275 appears; and then setting the desired position code 277 by pressing either open switch 278 or close switch 279 until the desired position code 277 is displayed. This process is repeated for each desired program period, such as morning, daytime, evening, and nighttime, for each day of the week. Activation of run program switch 283 causes the program control module 272 to transfer the programmed position code 299 and GO command 287 to the command decoder at the beginning of each new programmed time period throughout each day. In this manner flow control valves are repositioned to deliver the desired air flow for each program period. Activation of the hold position switch 284 causes the program control module 272 to override programmed control and to maintain flow control valves at their current positions. Programmed operation is restored by activation of the run program switch 283. Interface cable 288 connects directly to the command decoder to provide input position codes 299 and GO command 287. Operating power for the program control module 272 is supplied from the command decoder over the +V input 286 and the ground input 285.

Proportional Flow Control Module

In unusual or unexpected situations where the heat load in a room increases or decreases dramatically, it is desirable to provide air flow control that is adjusted to help compensate for the sudden associated change in room temperature. Examples of this situation include a large number of people quickly converging for a meeting in a small conference room, the periodic operation of a large machine that produces a substantial amount of heat or the initial turn-on of an HVAC system. A proportional flow control module is not illustrated here but is very similar to the program control module illustrated in FIG. 9. The proportional flow control module monitors the ambient temperature in a room and calculates the difference between the ambient temperature and the desired temperature. The difference is expressed in absolute value degrees to accommodate either a heating or cooling season where the ambient temperature number may be a smaller or larger number than the desired temperature. The absolute value of the difference in degrees is stored as a table in a uniquely programmed IC controller and display driver along with corresponding flow control valve position codes. They are stored and displayed as indicated in the program control module previously described. The following table illustrates a typical table for primary flow control valves (closed reference position):

| |Difference Temperature| | Position Code Selected |
|---|---|
| 10° | 7 |
| 8° | 6 |
| 6° | 5 |
| 4° | 4 |
| 2° | 3 |

In operation, the proportional flow control module monitors the ambient temperature, determines the absolute value of the difference temperature and causes the selected position code to be sent to the attached flow control valves. This results in the air flow being automatically adjusted from higher values at large absolute difference temperatures to smaller values as the difference decreases. The proportional flow control module allows the user to select a predetermined response to a rapid heat change, which can be used to produce the desired temperature in a faster and more accurate manner.

Home Automation Control

Figure 10:
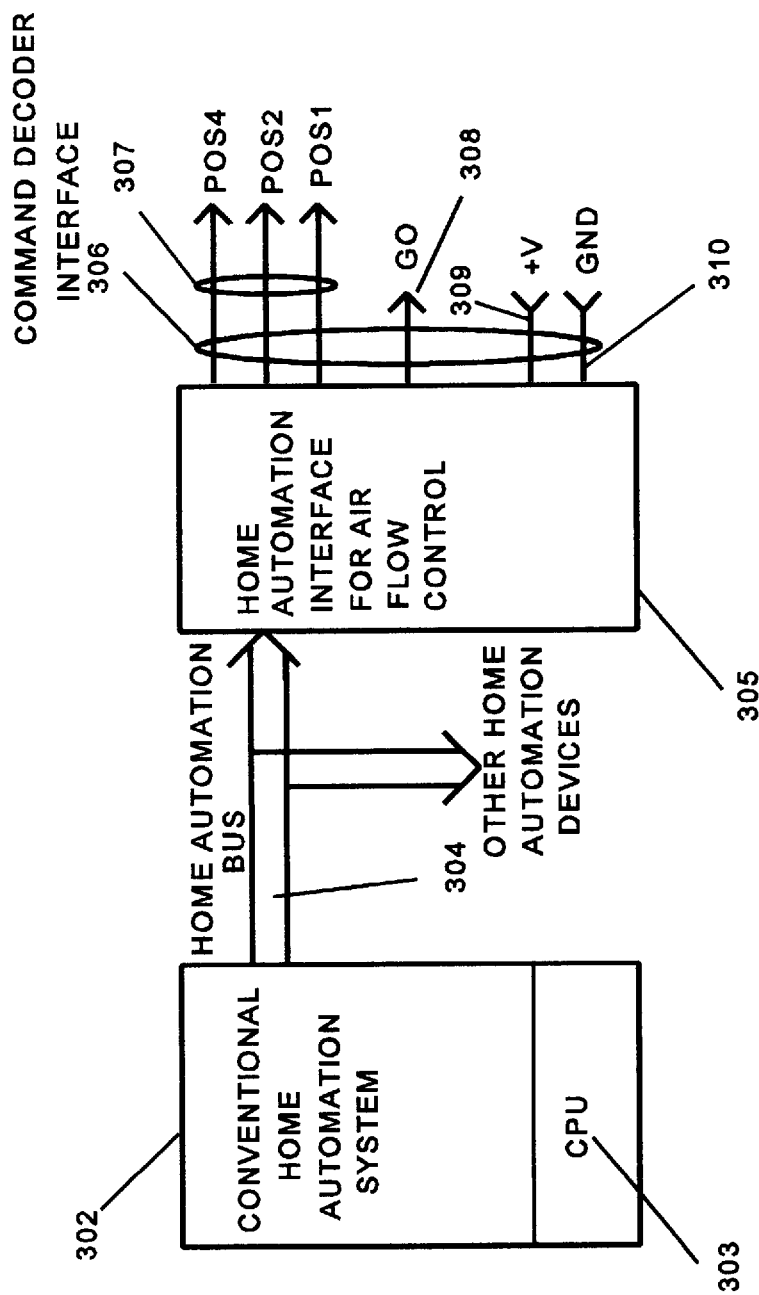
FIG. 10 illustrates a block diagram of a flow control interface to a conventional home automation system.

Referring now to FIG. 10, there is illustrated a block diagram of a method for allowing air flow to be controlled by a home automation system. A conventional home automation system 302 is shown that typically uses a proprietary bus 304 feeding a special home automation interface unit 305 designed to receive air flow control commands from the home automation bus 304 and to generate appropriate position codes 307 and a GO command 308 in response to the received air flow control commands. Interface cable 306 connects directly to the command decoder to provide a position code 307 and a GO command 308. Operating power for home automation interface unit 305 is supplied from command decoder over power input +V 309 and ground input 310. CPU 303 is typically included with conventional home automation systems to facilitate home automation programming. Air flow commands are programmed along with other home automation commands and transmitted over the conventional home automation bus 304.

Simple On/Off Flow Control

Figure 11:
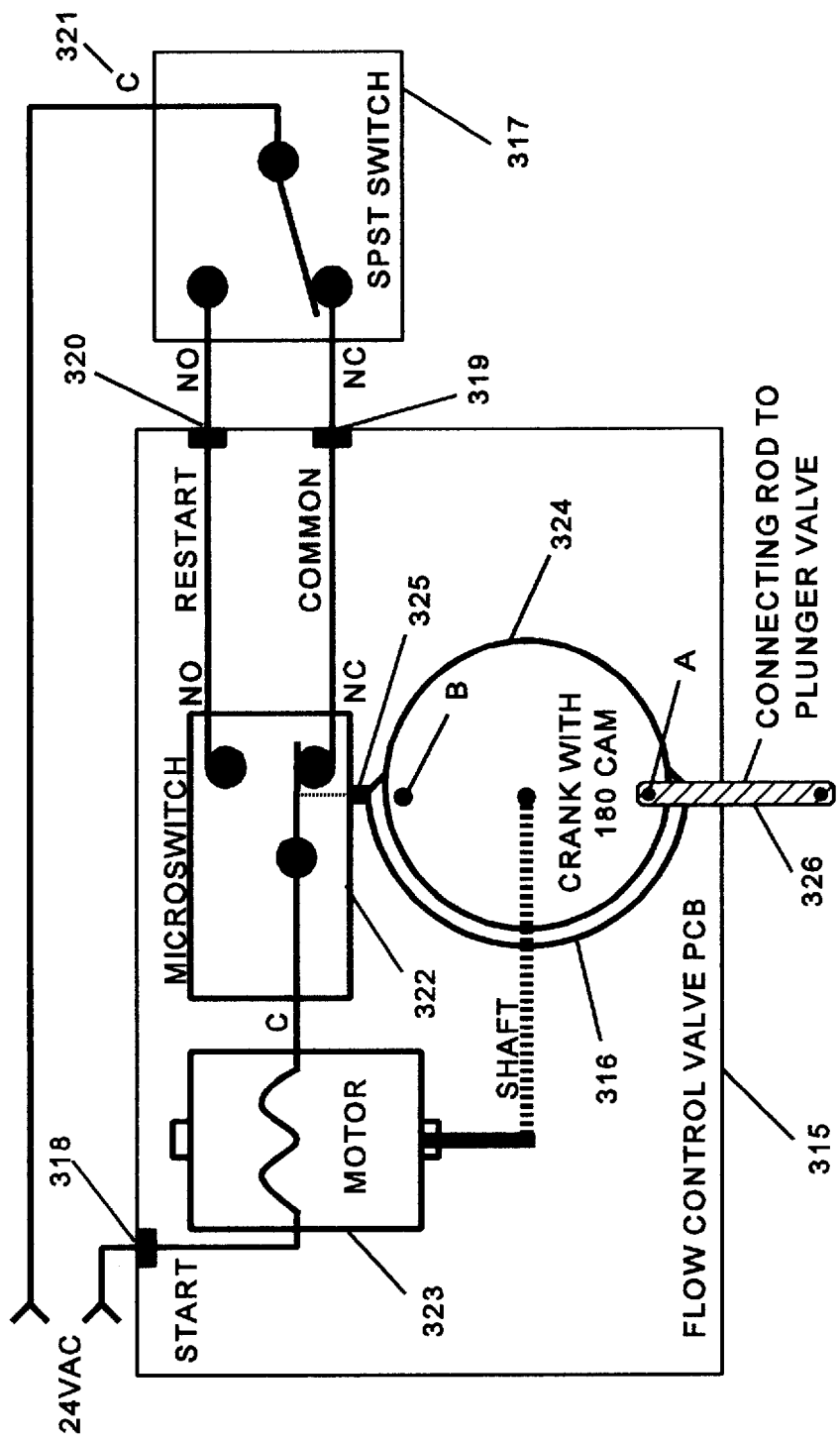
FIG. 11 illustrates a block diagram of a simplified system for on/off control of air flow.

Referring now to FIG. 11, there is illustrated a block diagram of a method for providing simple on or off air flow control. The previously described systems relate to full positional control of one or more flow control valves, all utilizing a command decoder and an associated flow control command device. The flow control valve printed circuit board (PCB) assembly 315 is identical to those previously shown with one exception. The short-duration cam previously described is replaced with a long-duration cam 316 which covers one half(180°) the circumference of crank 324. A single-pole-double-throw (SPDT) switch 317 is provided with common terminal C, normally open contacts NO, and normally closed contacts NC. The NO contact of switch 317 is connected to the RESTART terminal 320 of flow control valve PCB 315. The NC contact of switch 317 is connected to the COMMON terminal 319 of flow control valve PCB 315. The common C terminal 321 of switch 317 is connected to one side of the 24 VAC input power line. The START terminal 318 of flow control valve PCB 315 is connected to the other side of the 24 VAC input power line. Additional flow control valves, configured for either primary or complementary operation are added by connecting all flow control valve PCB 315 START terminals together, all RESTART terminals together, and all COMMON terminals together in a 3-wire bus configuration.

In operation, The NO contact of microswitch 322 is closed when long-duration cam 316 is in contact with actuator 325 and the NC contact is closed when long-duration cam 316 is not in contact with actuator 325. Long-duration cam 316 occupies one half the circumference of crank 324. Microswitch 322 thus changes state at two points spaced 180 degrees apart for a single rotation of crank 324. Assuming microswitch 322 has its NC contacts closed, the movement of switch 317 to its NC position allows current to flow from START terminal 318, through motor 323, the NC contact of microswitch 322, the NC contact of switch 317 and back to common C terminal 321. Motor 323 then runs to rotate crank 324 until long-duration cam 316 contacts actuator 325 causing microswitch 322 to switch to its NO contacts and interrupt motor current. Crank 324 stops at a position so that connecting rod 326 is either fully extended to open its associated flow control valve plunger or filly retracted to close its associated flow control valve plunger, depending on whether the connecting rod 326 is attached to crank 324 at point A or point B. Moving switch 317 to its NO contact with microswitch 322 at its NO position will likewise cause motor 323 to rotate crank 324 one half revolution where long-duration cam 316 will lose contact with actuator 325 and cause microswitch 322 to go to its NC position and interrupt current to motor 323. At this point connecting rod 326 has moved its associated flow control valve plunger to its complementary position, either fully open or fully closed. In this manner, the flow control valve associated with rod 326 is opened and closed simply by moving switch 317 from one position to the other. Any number of flow control valves can be bussed together and controlled from a single switch 317.

The set of single-pole-double-throw (SPDT) contacts depicted by switch 317 can be implemented with a number of control mechanisms. A standard 3-way electrical wall switch can be used for manual selection of on/off air flow control. A simple SPDT relay with a 115 VAC coil can be used to open room flow control valves when interior lights are turned on and close the valves automatically when the lights are turned off. An ordinary thermostat can be used to open room valves when the thermostat is calling and close valves when the thermostat is satisfied. A simple timer can be employed to open and close flow control valves at specific time periods during the day. Other control methods are possible given the simple switching mechanism employed for on/off air flow control when utilizing the flow control valves described herein.

Flow Control Remote Transmitter

Remote control of flow control valve position is implemented by use of a wireless remote control transmitter and a companion receiver. A preferred wireless communication media is ultrasonic pressure (sound) waves, although electromagnetic or infrared communications media may also be used. Some of the advantages of using ultrasonic communications media include the absence of man-made or natural interference, the ability of the media to reflect off solid surfaces and to travel into and through existing HVAC ductwork, and the fact that no FCC licensing is required. Ultrasonic remote control is implemented by connecting one or more ultrasonic transducers to two of the three flow control bus wires to form a transducer bus. Each transducer is positioned so that it can adequately sample the air space surrounding the remote control transmitter unit. A convenient mounting location for the receiving transducer is inside a duct register box within the room or an area where the remote control transmitter is expected to be used. Several transducers, each connected to the 2-wire transducer bus, may be used at various locations within the structure to provide extensive coverage for a roving remote control transmitter or from multiple transmitters at different locations.

Figure 12:
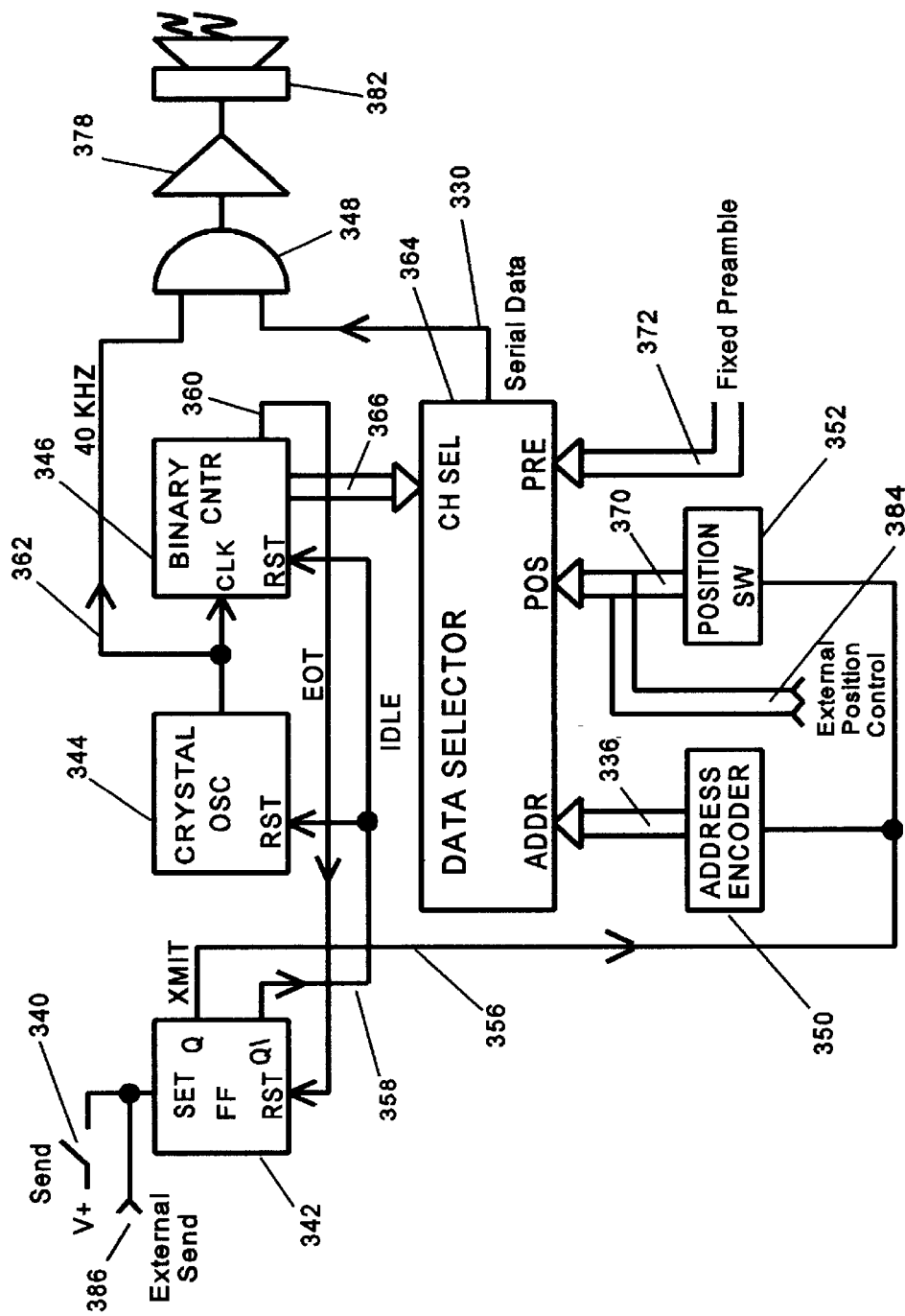
FIG. 12 illustrates a schematic diagram of the flow control command remote transmit device.

Referring to FIG. 12, there is illustrated a schematic diagram of the flow control command remote transmit device. Circuits described herein are mounted on a printed circuit board housed in a compact enclosure which is suitable for wall, table top mounting, or hand-held use. The unit is wireless and is powered by a small internal battery.

A push button momentary action switch 340 is provided having one input and one output. The input is connected to one terminal of the internal battery (V+) as a logical high signal. A flip-flop 342 is provided having two inputs and two outputs. A crystal controlled oscillator 344 is provided having one input and one output. A binary counter 346 is provided having two inputs and two outputs. A binary address encoder 350 is provided having one input and one output. An octal rotary position switch 352 is provided having one input and one output.

The output of switch 340 is connected to the SET terminal of flip-flop 342. An optional External Send input 386 is also connected to the SET terminal of flip-flop 342. The Q output 356 of flip-flop 342 is connected to the input of address encoder 350 and to the input of position switch 352. The Q\ output 358 of flip-flop 342 is connected to the reset (RST) inputs of crystal oscillator 344 and binary counter 346. The reset (RST) input of flip-flop 342 is connected to one output 360 of binary counter 346.

An AND gate 348 is provided having two inputs and one output. The output 362 of oscillator 344 is connected to the clock (CLK) input of binary counter 346 and to one input of AND gate 348. A data selector 364 is provided having four inputs and one output. One output 366 of binary counter 346 is connected to the channel select (CHSEL) input of data selector 364. The output 370 of position switch 352 is connected to the position (POS) input of data selector 364. Provision is made for an external connection 384 to the POS input of data selector 364 which is used in conjunction with external Send 386 for external logic control of the remote transmitter. A fixed preamble bit pattern 372 is provided as a hard-wired connection PRE to one input of data selector 364. The output 336 of address encoder 350 is connected to the address (ADDR) input of data selector 364. The serial data output 330 of data selector 364 is connected to the second input of AND gate 348.

A transducer driver 378 is provided having one input and one output. A piezoelectric transducer 382 is provided having one electrical input and an ultrasonic pressure wave output. The output of AND gate 348 is connected to the input of driver 378. The output of driver 378 is connected to the input of transducer 382. Transducer 382 is coupled to the surrounding air and acts to modulate the ambient air pressure in response to its electrical input signal.

A manual transmission cycle is initiated by setting the octal rotary switch 352 to one of eight positions and manually activating the push-button Send switch 340. Activation of switch 340 places a logical high on the SET input of flip-flop 342, causing the Q output 356 to go to a logical high state and the Q\ output 358 to go to a logical low state. The logical high on the Q output 356 of flip-flop 342 provides input voltage to address encoder 350 and to octal switch 352. This enables a 4-bit binary address code 336 and a 3-bit position code 370 at data selector 364 input terminals ADDR and POS during a transmit cycle. The logical low at the Q\ output 358 removes the reset from oscillator 344 and binary counter 346 and allows both to operate. The oscillator is crystal controlled to the resonant frequency of the output transducer 382. Its output 362 is input to AND gate 348 and binary counter 346 where it is counted down to generate a 4-bit binary channel address code 366 for data selector 364. This action causes logical data POS 370, PRE 372 and ADDR 336 which are available at the data selector 364 input channels to be sequentially routed to the serial output terminal 330. Serial data 330 is routed to the second input terminal of AND gate 348 where it is effective to gate the oscillator signal 362 on and off in response to the serial data pattern of logical ones and zeroes. The gated output from AND gate 348 is applied to driver 378, then to the output transducer 382 where it is converted to ultrasonic pressure waves for transmission to a receive transducer device. Binary counter 346 generates an EOT (end of transmission) 360 signal coincident with the end of the last channel select period for data selector 364. EOT 360 signal is connected to the reset (RST) terminal of flip-flop 342, causing the Q output 356 to go to its logical low state and the Q\ output to return to its logical high or idle state. This action causes both the oscillator 344 and the binary counter 346 to return to their inactive or reset state and removes input voltage from the address encoder 350 and the octal switch 352. In this "idle" state, all circuits are powered and can instantly respond to another transmission cycle to update the position of all flow control valves. Since CMOS logic is used to implement the flow control command remote transmit device transmitter it uses essentially no power to operate in this idle or static state. This is essential to prolonging battery life.

Remote Control Receiver

The remote control receiver input is connected to the 2-wire transducer bus. It receives electrical signals from any ultrasonic transducer tied to the bus and provides remote transmitter address verification, error checking, flow control valve position code detection, and generates a GO signal for the Command Decoder if and only if a valid digital code sequence is received from a remote transmitter. Upon receipt of a GO signal the Command decoder causes all flow control valves to move to a position defined by the position code transmitted from the remote control transmitter. The remote control receiver can be positioned anywhere within the structure but is most conveniently positioned near or integrated with the command decoder so that control and signal input wiring is minimized.

Figure 13:
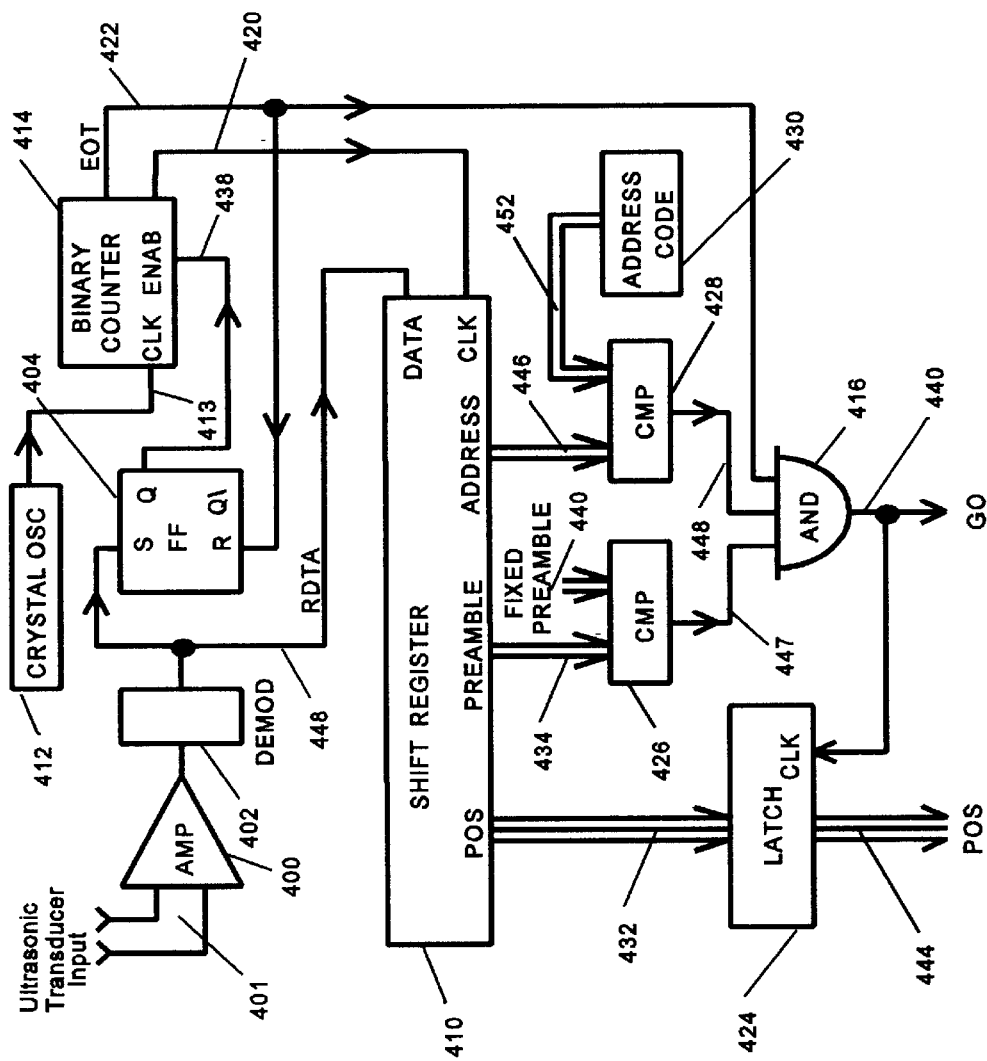
FIG. 13 illustrates a schematic diagram of the flow control command remote receive device.

Referring now to FIG. 13, there is illustrated a schematic diagram of the flow control command remote control receiver. The remote control receiver has one input 401 and two outputs, position code POS 444 and GO 440 signal. The input 401 is connected to the transducer bus and receives electrical signals picked up by the ultrasonic transducer(s). A high gain amplifier 400 is provided having one input and one output. A demodulator 402 is provided having one input and one output. The output of amplifier 400 is connected to the input of demodulator 402.

A flip-flop 404 is provided having two inputs and one output. A shift register 410 is provided having two inputs and three outputs. A crystal controlled oscillator 412 is provided having one output. A binary counter 414 is provided having two inputs and two outputs. An AND gate 416 is provided having three inputs and one output. The output 448 of demodulator 402 is connected to the set (S) input of flip-flop 404 and to the DATA input of shift register 410. The Q output 438 of flip-flop 404 is connected to the enable (ENAB) input of binary counter 414. Crystal oscillator 412 output 413 is connected to the clock (CLK) input of binary counter 414. One output 420 from binary counter 414 is connected to the clock (CLK) input of shift register 410. The second output 422 (EOT) from binary counter 414 is connected to the reset (R) input of flip-flop 404 and to one input of AND gate 416.

A latch 424 is provided having two inputs and one output. A first digital comparator 426 is provided having two inputs and one output. A second digital comparator 428 is provided having two inputs and one output. A programmable address code module 430 is provided having one output. One output 432 from shift register 410 is connected to one input of latch 424. A second output 434 from shift register 410 is connected to one input of digital comparator 426. The second input 440 to digital comparator 426 is a fixed bit pattern logically equal to the expected preamble from the remote transmit device. A third output 446 from shift register 410 is connected to one input of second digital comparator 428. The output 452 from address module 430 is connected to the second input of digital comparator 428. The output 447 of digital comparator 426 is connected to the first input of AND gate 416. The output 448 of digital comparator 428 is connected to the second input of AND gate 416. The output 422 (EOT) of binary counter 414 is connected to the third input of AND gate 416. The output GO 440 of AND gate 416 is connected to the clock (CLK) input of latch 424. The output 444 of latch 424 is connected as an external output position (POS) code. The output 440 of AND gate 416 is connected as an external output signal GO. Both the GO and POS outputs are provided as inputs to the command decoder.

When connected to the command decoder, the flow control command remote receive device remains in an "idle" state awaiting a transmit cycle from the remote transmit device. In the current embodiment, a total of sixteen digital "bits" are transmitted during each single transmit cycle initiated by the remote transmit device. The number of bits transmitted is arbitrary and a change in this number in no way alters the claims of this patent. Received ultrasonic data is coupled through the narrow band (high Q) transducer(s) and amplified in a narrow band amplifier 400. Digital modulation of the ultrasonic carrier is recovered as serial data in demodulator 402. The demodulation technique employed is covered under U.S. Pat. No. 5,449,192 and is very tolerant of serious multi-path and fading problems common in other ultrasonic communication systems. Receipt of the first bit of a transmit sequence causes an output from demodulator 402 which forces flip-flop 404 to go to its SET state. The Q output 438 goes to a logical high state and enables binary counter 414. Binary counter 414 then counts down the clock input 413 from crystal oscillator 412 and provides a serial shift clock 420 to shift register 410. This clock is phased and timed so as to allow shift register 410 to properly sample and shift the received serial data (RDTA) 448 from demodulator 402 at the proper time. After sixteen clock periods, binary counter 414 generates an end-of transmission (EOT) 422 signal which acts to reset flip-flop 404. The Q output 438 of flip flop 404 goes logically low and disables binary counter 414, stopping additional shift clocks 420 at the CLK input to shift register 410. At this time, the sixteen bits received from the remote transmit device are stored in shift register 410 and will remain there until overwritten by another transmit cycle from the remote transmit device.

Data integrity is verified and checked in the following manner. Digital comparator 426 continuously compares the preamble bits 434 from shift register 410 to a predetermined pattern of ones and zeroes 440. It provides a logic high output 447 to AND gate 416 only if a valid preamble comparison exists. Digital comparator 428 continuously compares the address bits 446 from shift register 410 to the preprogrammed address bits 452 from address code module 430. It provides a logic high output 448 to AND gate 416 only if a valid address comparison exists. The EOT 422 signal from binary counter 414, signifying the end of a transmission sequence, is applied to the third input of AND gate 416. AND gate 416 provides an output 440 only if both preamble comparator 426 and address comparator 428 are logically true, signifying that a high degree of confidence can be placed in the reliability of that particular transmit sequence. Otherwise, the transmission sequence is rejected and no GO 440 output is generated to allow a re-positioning of the flow control valves.

Assuming correct preamble and address reception, the EOT 422 signal causes an output 440 from AND gate 416 which is applied to the clock (CLK) input of latch 424. This action causes position data bits 432 to be stored in latch 424. The position code output POS 444 from latch 424 and the GO output 440 from AND gate 416 are presented as input to the command decoder. Position data remains stored in latch 424 until a properly verified update request is received from the remote transmit device.

Command Decoder

Figure 14:
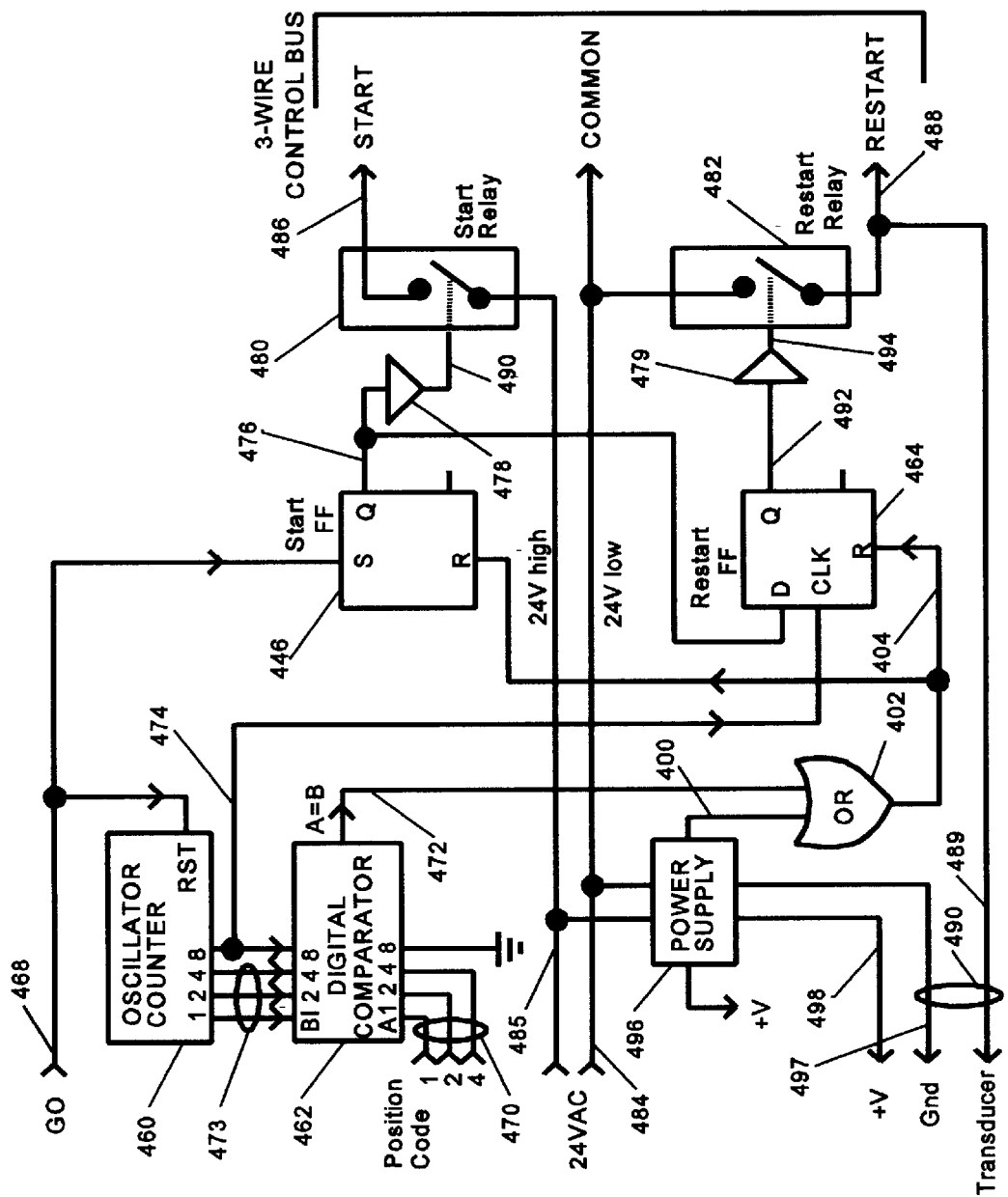
FIG. 14 illustrates a schematic diagram of the command decoder.

Referring now to FIG. 14, there is illustrated a schematic diagram of the command decoder. Inputs are provided for control signals GO 468 and position code 470. Input is also provided for 24 VAC high 485 and 24 VAC low 484. Outputs START 486, RESTART 488, and COMMON 484 are provided to drive a 3-wire control bus. Outputs +V 498, GND 497, and Transducer 489 are provided for use by auxiliary control modules. A digital comparator 462 is provided having four inputs and one output. An oscillator/counter 460 is provided having one input and two outputs. A flip-flop 464 is provided having three inputs and one output. A flip flop 446 is provided having two inputs and one output. A logical OR gate 402 is provided having two inputs and one output.

The GO input 468 is connected to the reset (RST) terminal of oscillator/counter 460 and to the set (S) terminal of start flip flop 446. One output 473 from oscillator/counter 460 is connected to the "B" inputs (B1,B2,B4) of digital comparator 462. The Position code input 470 is connected to the "A" inputs (A1,A2,A4) of digital comparator 462. The second output 474 from oscillator/counter 460 is connected to the clock (CLK) input of restart flip flop 464, and to the B8 input of digital comparator 462. The A8 input of digital comparator 462 is connected to logical ground. The output 472 of digital comparator 462 is connected to one input of OR gate 402. The output 404 of OR gate 402 is connected to the reset (R) terminals of flip flops 464 and 446.

Two identical relay drivers 478 and 479 are provided, each having one input and one output. Two identical bus control relays 480 and 482 are provided, each having one control input, one fixed input, and one switched output connection. The Q output 476 from start flip flop 446 is connected to the input of relay driver 478 and to the Data (D) input of Restart flip flop 464. The output 490 of relay driver 478 is connected to the control input of Start Relay 480. The switched output 486 of start relay 480 is connected to the START terminal of the 3-wire control bus. The 24 Volt high input 485 is connected to the fixed input of Start relay 480. The Q output 492 of Restart flip flop 464 is connected to the input of relay driver 479. The output 494 of relay driver 479 is connected to the control input of Restart relay 482. The 24 Volt low input 484 is connected to the fixed input of Restart relay 482. The switched output 488 from Restart relay 482 is connected to the RESTART terminal of the 3-wire control bus. RESTART line 488 is also connected to the transducer signal output pin 489. A power supply 496 is provided having two inputs and two outputs. The 24 Volt high input 485 is provided as one input to power supply 496. The 24 Volt low input 484 is provided as the second input to power supply 496. The output 498 of power supply 496 is connected to the output pin +V and is also used internally to provide operating voltage to the electronic components which make up command decoder. A supervisory output 400 from power supply 496 is connected to the second input of OR gate 402. The supervisory output 400 from power supply 496 acts through OR gate 402 to reset start flip flop 446 and restart relay 464 to remove drive voltage from the control bus when any overload condition is sensed by the power supply supervisory circuit. The supervisory circuit also generates a power on reset to flip flops 446 and 464 whenever power is applied to the 24 VAC input terminals 485 and 484, preventing the output bus from being momentarily activated when power is applied.

Receipt of GO 468 signal from an external control device causes the Set (S) terminal of flip flop 446 to momentarily go to a high logical state, setting the Q output 476 of flip flop 446 to its high state. This acts through driver 478 to energize start relay 480 which switches 24 Volt high 485 signal to the START terminal for the control bus. This provides excitation to all connected flow control valve motors to cause each to move to its predetermined reference position (fully open or fully closed) and automatically stop. GO 468 signal is also applied to the Reset (RST) terminal of oscillator/counter 460 which resets binary output 473 and 474 to zero and enables the counter to begin counting down an internal oscillator signal. After a fixed delay, which is more than sufficient time to allow all connected flow control valves to reach their reference positions, output 474 goes logically high and clocks Restart flip flop 464 to a high state at its Q output 492. The connection at the Data (D) input of flip flop 464 insures that flip flop 464 is only enabled if start flip flop 446 has been previously enabled. Setting flip flop 464 high causes restart relay 482 to close, applying 24 Volt low 484 or COMMON to the RESTART terminal 488 of the control bus. This action causes all associated flow control valve actuators to begin moving off their reference positions. Simultaneously with the output of clock 474 signal, counter 460 begins to output a binary count sequence 473 starting at count zero.

The internal oscillator of oscillator/counter 460 is set so that the binary counter is incremented seven counts during the time required for the flow control valve actuators to move from fully open to fully closed. In this manner, eight discrete flow control valve positions are defined by the timed binary number sequence 473, assuming the counter begins counting from binary zero as each flow control valve begins moving from either a fully closed or fully open reference position. Binary output 473 is one input to digital comparator 462. The other input to digital comparator 462 is the octal position code 470. When the two digital inputs 470 and 473 compare, digital comparator 462 outputs a signal 472 to OR gate 402. The output 404 from OR gate 402 is applied to the Reset (R) terminals of both flip flops 464 and 446, forcing the Q outputs from both low, thus removing drive voltage from both start relay 480 and restart relay 482. This action removes drive voltage from the control bus and causes all flow control devices attached to the flow control bus to stop. The stop position is set by the position command code 470. In this manner, all flow control valves are set to one of eight positions from fully closed or fully open as the position code 470 is incremented from binary zero to binary seven.

What is claimed is:

1. A method for selectively controlling air flow from at least one efferent end of the ducts of an HVAC system, comprising the steps of:

selecting a desired air flow through the HVAC ducts in response to flow control signals using a flow control valve interfaced with at least one efferent end of the HVAC ducts;

generating flow control commands using a flow control command device;

converting the flow control commands to flow control signals using a command decoder; and moving the flow control valve to a known reference position, and moving the flow control valve from the reference position to a position that produces the desired air flow using the flow control signals.

2. The method of claim 1 wherein the step of moving comprises moving the flow control valve for a specific period of time at a nonlinear displacement rate.

3. The method of claim 1 wherein the step of moving comprises moving the flow control valve for a specific period of time at a linear displacement rate.

4. The method of claim 1 wherein the step of converting comprises receiving a digital flow control command input comprised of a GO signal that initiates a timed flow control signal output that drives a motor to enable the flow control valve to move to a reference position, and a digital flow control command input further comprised of a digital position code that produces a timed flow control signal output that drives a motor to enable the flow control valve to move from it's reference position to a position determined by the magnitude of the digital position code.

5. The method of claim 1 wherein the step of generating comprises using a flow control command device that is connected to the command decoder by wireless means.

6. The method of claim 1 wherein the step of generating comprises manually selecting an air flow.

7. The method of claim 1 wherein the step of generating comprises selecting air flows for specific periods of time on specific days of the week.

8. The method of claim 1 wherein the step of generating is controlled by temperature.

9. The method of claim 1 wherein the step of generating comprises selecting an air flow that is proportional to the magnitude of the difference between a desired temperature and the actual temperature.

10. The method of claim 1 wherein the step of generating comprises selecting an air flow requested by a home automation system.

11. A method for selectively controlling air flow from at least one primary flow control valve interfaced with at least one efferent end of the ducts of an HVAC system and at least one complementary flow control valve interfaced with at least one other efferent end of the ducts of an HVAC system with minimal change in the total air flow through the HVAC system, comprising the steps of:

selecting a desired air flow through the HVAC ducts in response to flow control signals using a primary flow control valve interfaced with at least one efferent end and at least one complementary flow control valve interfaced with at least another efferent end of the HVAC ducts;

generating flow control commands using a flow control command device;

converting the flow control commands to flow control signals using a command decoder;

moving at least one primary flow control valve to a known reference position, and moving at least one complementary flow control valve to a complementary reference position using flow control signals;

moving each flow control valve from it's reference position to positions that produce complementary air flow using flow control signals;

locating at least one master thermostat proximate to at least one primary flow control valve;

locating at least one slave thermostat proximate to at least one complementary flow control valve; and connecting the thermostats in a logical AND configuration that requires all connected thermostats to be calling in order to enable the HVAC system to be operated.

12. The method of claim 11 wherein the step of moving comprises moving the flow control valves for specific periods of time at nonlinear displacement rates.

13. The method of claim 11 wherein the step of moving comprises moving the flow control valves for specific periods of time at linear displacement rates.

14. The method of claim 11 wherein the step of converting comprises receiving a digital flow control command input comprised of a GO signal that initiates a timed flow control signal output that drive motors to enable the flow control valves to move to their reference positions, and a digital flow control command input further comprised of a digital position code that produces a timed flow control signal output that drives motors to enable the flow control valves to move from their reference positions to positions determined by the magnitude of the digital position code.

15. The method of claim 11 wherein the step of generating comprises using a flow control command device that is connected to the command decoder by wireless means.

16. The method of claim 11 wherein the step of generating comprises manually selecting an air flow.

17. The method of claim 11 wherein the step of generating comprises selecting air flows for specific periods of time on specific days of the week.

18. The method of claim 11 wherein the step of generating is controlled by temperature.

19. The method of claim 11 wherein the step of generating comprises selecting an air flow that is proportional to the magnitude of the difference between a desired temperature and the actual temperature.

20. The method of claim 11 wherein the step of generating comprises selecting an air flow requested by a home automation system.

21. The method of claim 11 wherein at least one complementary flow control valve is connected as a bypass between the air outlet and the air inlet of the HVAC system.

22. A flow control system for selectively controlling air flow from at least one efferent end of the ducts of an HVAC system, comprising:

a flow control valve interfaced with at least one efferent end of the HVAC ducts, said flow control valve operable to control the flow of air therethrough in response to flow control signals;

a flow control command device for generating flow control commands;

a command decoder for converting flow control commands to flow control signals;

a positioning system for moving said flow control valve to a known reference position; and moving said flow control valve from said known reference position to a position that produces the desired air flow using said flow control signals.

23. The system of claim 22 wherein said positioning system is a motor connected to a mechanical assembly that moves the flow control valve at a nonlinear displacement rate.

24. The system of claim 22 wherein said positioning system is a linear actuator that moves the flow control valve at a linear displacement rate.

25. The system of claim 22 wherein the command decoder is a converter that accepts flow control commands composed of a digital position code and a digital GO signal and produces flow control signals composed of an output start signal, whose duration in time is sufficient to drive a motor to position the flow control valve at a known reference position and said converter produces flow control signals composed of an output restart signal, whose duration is proportional to the magnitude of said digital position code and sufficient to drive a motor to position the flow control valve from the reference position to a position that produces the desired air flow.

26. The system of claim 22 wherein said flow control command device is connected to the command decoder using wireless means.

27. The system of claim 22 wherein said flow control command device is a control that allows manual air flow selection.

28. The system of claim 22 wherein said flow control command device is an apparatus that selects air flows for specific periods of time on specific days of the week.

29. The system of claim 22 wherein said flow control command device is an apparatus the selects air flows by temperature.

30. The system of claim 22 wherein said flow control command device is an apparatus that selects an air flow that is proportional to the magnitude of the difference between a desired temperature and the actual temperature.

31. The system of claim 22 wherein said flow control command device is an apparatus that selects an air flow requested by a home automation system.

32. The system of claim 22 wherein said flow control valve is composed of a round, elliptical-shaped plunger and a compatible valve seat that exhibits aerodynamic compliance and thereby reduces air flow turbulence and noise.

33. The system of claim 22 wherein said flow control signals share a common bus with receive transducers.

34. A flow control system for selectively controlling air flow from at least one primary flow control valve interfaced with at least one efferent end of the ducts of an HVAC system and at least one complementary flow control valve interfaced with at least one other efferent end of the ducts of an HVAC system with minimal change in the total air flow through the HVAC system, comprising:

a primary flow control valve interfaced with at least one efferent end and at least one complementary flow control valve interfaced with at least one other efferent end of the HVAC ducts, said flow control valves operable to control the flow of air therethrough in response to flow control signals;

a flow control command device for generating flow control commands;

a command decoder for converting the flow control commands to flow control signals;

a positioning system for moving at least one primary flow control valve to a known reference position, and for moving at least one complementary flow control valve to a complementary reference position, and for moving each flow control valve from it's reference position to positions that produce complementary air flow using flow control signals;

at least one master thermostat located proximate to at least one primary flow control valve;

at least one slave thermostat located proximate to at least one complementary flow control valve; and a logical AND connection between the thermostats that requires all connected thermostats to be calling in order to enable the HVAC system to be operated.

35. The system of claim 34 wherein said positioning system is a motor connected to a mechanical assembly that moves the flow control valve at a nonlinear displacement rate.

36. The system of claim 34 wherein said positioning system is a linear actuator that moves the flow control valve at a linear displacement rate.

37. The system of claim 34 wherein the command decoder is a converter that accepts flow control commands composed of a digital position code and a digital GO signal and produces flow control signals composed of an output start signal, whose duration in time is sufficient to drive a motor to position the primary flow control valve at a known reference position and a motor to position the complementary flow control valve at a known complementary reference position and said converter produces flow control signals composed of an output restart signal, whose duration is proportional to the magnitude of said digital position code and sufficient to drive a motor to position the flow control valves from their reference positions to positions that produce the desired air flow.

38. The system of claim 34 wherein said flow control command device is connected to the command decoder using wireless means.

39. The system of claim 34 wherein said flow control command device is a control that allows manual air flow selection.

40. The system of claim 34 wherein said flow control command device is an apparatus that selects air flows for specific periods of time on specific days of the week.

41. The system of claim 34 wherein said flow control command device is controlled by temperature.

42. The system of claim 34 wherein said flow control command device is an apparatus that selects air flow that is proportional to the magnitude of the difference between a desired temperature and the actual temperature.

43. The system of claim 34 wherein said flow control command device is an apparatus that selects an air flow requested by a home automation system.

44. The system of claim 34 wherein said flow control valve is composed of a round, elliptical-shaped plunger and a compatible valve seat that exhibits aerodynamic compliance and thereby reduces air flow turbulence and noise.

45. The system of claim 34 wherein the flow control signals share a common bus with receive transducers.

46. The system of claim 34 wherein the complementary flow control valve is connected as a bypass between the plenum outlet and the air inlet of the HVAC system.

* * * * *